(12) United States Patent
Wu

(10) Patent No.: US 8,724,200 B1
(45) Date of Patent: May 13, 2014

(54) MEMS HIERARCHICALLY-DIMENSIONED OPTICAL MIRRORS AND METHODS FOR MANUFACTURE THEREOF

(76) Inventor: Xingtao Wu, Woburn, MA (US)

(*) Notice: Subject to any disclaimer, the term of this patent is extended or adjusted under 35 U.S.C. 154(b) by 284 days.

(21) Appl. No.: 12/901,327

(22) Filed: Oct. 8, 2010

Related U.S. Application Data

(63) Continuation-in-part of application No. 12/505,368, filed on Jul. 17, 2009, now Pat. No. 8,139,280.

(60) Provisional application No. 61/249,600, filed on Oct. 8, 2009.

(51) Int. Cl.
*G02B 26/08* (2006.01)

(52) U.S. Cl.
USPC ........................................ 359/224.1

(58) Field of Classification Search
CPC ........... G02B 26/0816; G02B 26/0833; G02B 26/0858
USPC .......... 359/223.1–226.1, 290, 291, 845, 849, 359/871, 872
See application file for complete search history.

(56) References Cited

U.S. PATENT DOCUMENTS

| 6,947,201 | B2 * | 9/2005 | Ealey | 359/224.1 |
| 7,084,554 | B2 * | 8/2006 | Xu et al. | 310/332 |
| 7,753,538 | B2 * | 7/2010 | Nagashima et al. | 359/849 |

* cited by examiner

*Primary Examiner* — Euncha Cherry
(74) *Attorney, Agent, or Firm* — Xingtao Wu

(57) ABSTRACT

MEMS hierarchically-dimensioned optical mirrors, each comprising a substrate, a plurality of spacers disposed on the substrate, a plurality of piezoelectric/electrostrictive cantilever microactuators disposed on the plurality of spacers, and a monolithic deformable mirror or a segmented mirror array disposed on the plurality of the cantilever assemblies, having significantly improved overall device performances owing to the use of the cantilever microactuators based on relaxor ferroelectric single crystal materials and/or other piezoelectric/electrostrictive materials, are disclosed along with methods of manufacturing such devices.

40 Claims, 36 Drawing Sheets

FIG. 15G-I

Single Crystal Silicon Substrate

Piezoelectric Single Crystal Substrate

Bonding of SOI Substrate with Piezoelectric Single Crystal Substrate

Thickness Reduction of Piezoelectric Single Crystal Substrate

Processing on the PMN-PT/SOI Composite Substrate (Step 2075)

Reduction of PMN-PT Crystal Thickness (Step 2075A)

Etch of PMN-PT/Metal/Adhesive/Silicon/Oxide Stack (Step 2075B)

Formation of Metal Pattern for Post Layer (Step 2075C)

Bimorph Electrode Deposition and Etch (Step 2075D)

MEMS HIERARCHICALLY-DIMENSIONED OPTICAL MIRRORS AND METHODS FOR MANUFACTURE THEREOF

CROSS-REFERENCE TO RELATED APPLICATIONS

This application is a continuation in part of U.S. patent application Ser. No. 12/505,368, filed Jul. 17, 2009 now U.S. Pat. No. 8,139,280 and claims priority from provisional application No. 61/249,600, filed on Oct. 8, 2009, the disclosure of which are incorporated herein by reference in their entirety.

FIELD OF THE INVENTION

The present invention relates to adaptive optics. More specifically, it relates to optical Electro-Mechanical Systems (MEMS) mirrors that are actuated by piezoelectric cantilever structure(s) with improved performances.

BACKGROUND OF THE INVENTION

Optical signals are distorted as they propagate in fluctuating media like atmospheric turbulence. A system to correct the distortion, known as adaptive optics (AO), is employed to optimize system performances in the presence of the random disturbances. Such adaptive wavefront correction is usually achieved by introducing a spatially varying pattern of optical path differences across the aperture of the receiving optical system using deformable Mirror (DM) technology. As a critical element to such systems, deformable mirrors offer the greatest promises for high performance wavefront correction. Conventional deformable mirrors use multiple bulk piezoelectric actuators or magnetic actuators to deform mirrors. While these mirrors offer high accuracy and are capable of conforming to wavefront distortion associated with broad or narrow band spectrums, they tend to be bulky, heavy, expensive, and typically operate with less than 1000 actuators and at relative slow speed. An emerging generation of deformable mirror (DM) technologies based on Micro-Electro-Mechanical Systems (MEMS) manufacturing is promising to lead to DM components with capabilities exceeding those of conventional DMs while, at the same time, reducing cost, weight, and power electronics requirements. MEMS-based deformable mirror technologies, especially those based on electrostatic actuators, have been successful in small stroke applications. However, large stroke deformable mirror systems using MEMS actuators have not yet demonstrated sufficient attractive combinations of high stroke, low voltage, and high system reliability.

In general, there are two dominant types of deformable mirrors: segmented deformable mirrors and continuous-face-sheet deformable mirrors. A segmented mirror does not have a continuous mirror surface but has individually controllable tip, tilt, and piston motion on each mirror segment. These mirrors have the advantage of segments being independently controllable. Its primary drawback is the gap between mirror segments that can scatter and diffract light in an undesired and uncontrolled manner. The drawback can be partially avoided by using the second type of deformable mirror that has a continuous faceplate with an array of actuators attached underneath. The actuators can be designed to push and/or pull the mirror surface. Since the surface is continuous, there is some mechanical crosstalk (or influence function) coupled from one actuator to its adjacent mirror members. Thus, an optimized mechanical design is usually in need to minimize the crosstalk, and a computer algorithm may be developed to factor in the effects of influence function into the mirror control signals.

With regard to the continuous-face-sheet deformable mirror, the U.S. Pat. No. 6,384,952 to Clark et al. (2002), incorporated herein by this reference, discloses a continuous-face-sheet DM that employs a mirrored membrane fabricated, for example, from metal-coated silicon nitride and actuated by an array of vertical comb electrostatic actuators that are disposed underneath the membrane. Use of vertical comb actuators can provide larger stroke for a given applied voltage than the parallel plate electrostatic actuators in other continuous-face-sheet designs. However, this design requires placing vertical two teeth sets precisely relative to each other, one on the substrate and the other suspended on a membrane member, respectively, thus is unduly complicated in manufacturing the DM structure. Moreover, because of the electrostatic actuation, the device does not offer sufficient actuation force to meet the stringent requirements of a deformable mirror device for adaptive optics applications.

U.S. Pat. No. 7,336,412 to Yang (2008), also incorporated herein by this reference, describes a micro-controllable continuous-face-sheet deformable mirror comprising a mirror membrane and under which a plurality of controllable piezoelectric microactuators is coupled to the mirror membrane. Each piezoelectric microactuators comprises a pedestal, a piezoelectric microactuator, and a supporting substrate. The piezoelectric actuator structure is mounted on the supporting substrate and has electrodes defined on opposing surfaces so that in-plane stresses electrically induced in its piezoelectric layer cause the actuator membrane to bend out of the unstressed plane in a selected direction. In this prior invention, the pedestal is connected to the mirror membrane to couple deformation of the piezoelectric actuator into substantially local deformation of the mirror membrane. However, because each of the piezoelectric actuator is mechanically a continuous membrane structure having the pedestal located at or near the membrane center, the bending deformation of the piezoelectric actuator induced by an in-plane stresses is significantly restricted. Furthermore, because of its thin film deposition method in manufacturing the deformable mirror, the reliability of the mirror system is not satisfactory.

On the other hand, with regard to the segmented deformable mirrors, the U.S. Pat. No. 7,019,434 to Helmbrecht (2006), incorporated herein by this reference, discloses an electrostatically-actuated segmented mirror apparatus comprising a substrate and the segmented mirror array elevated above the substrate and supported by curved flexures. While use of the curved flexures enables high stroke, the mirror operation in this prior invention still suffers high voltage actuation. In addition, due to the film deposition process in use, residual gradient stress unavoidably builds up through the actuator thickness and the flexure, inducing multiple problems to the actuator including bowing, tilting, position shift in the long run, and sensitivity to the thermal variations. Although efforts can be taken to optimize the residual stress, the problem remains a significant concern. In fact, stress engineering in thin-film micromachining is usually a time-consuming and labor-intensive procedure. Being sensitive to film geometry and thickness designs, the optimized recipe is neither fully transferrable nor scalable to a new actuator design that may have a modified dimension set, film aspect ratio, and/or layout geometry.

SUMMARY OF THE INVENTION

It is therefore an object of this invention to provide a new continuous-face-sheet deformable mirror with high device performances including higher stroke, larger force, higher speed, and with significantly lower actuation voltage.

It is therefore an object of this invention to provide a new segmented mirror device concurrently featured with higher stroke, larger force, higher speed, and with significantly lower actuation voltage.

This invention results from the realization that a new optical MEMS, hierarchically-dimensioned, and continuous-face-sheet deformable mirror having significantly improved overall system performances can be constructed by using piezoelectric/electrostrictive cantilevers that are made of ceramics or relaxor ferroelectric single crystals.

In one aspect, the invention related to a method of producing the hierarchically-dimensioned continuous-face-sheet deformable mirror by using bimorph cantilever actuators that are made of ceramics or relaxor ferroelectric single crystal.

In another aspect, the invention related to a method of producing the hierarchically-dimensioned continuous-face-sheet deformable mirror by using unimorph cantilever actuators that are made of ceramics or relaxor ferroelectric single crystal.

In another aspect, the invention related to a method of producing the hierarchically-dimensioned continuous-face-sheet deformable mirror by using multimorph cantilever actuators that are made of ceramics or relaxor ferroelectric single crystal.

This invention also results from the realization that a new optical MEMS, hierarchically-dimensioned, and segmented deformable mirror having significantly improved overall system performances can be constructed by using piezoelectric/electrostrictive cantilevers that are made of ceramics or relaxor ferroelectric single crystals.

In one aspect, the invention related to a method of producing the hierarchically-dimensioned segmented deformable mirror by using bimorph cantilever actuators that are made of ceramics or relaxor ferroelectric single crystal.

In another aspect, the invention related to a method of producing the hierarchically-dimensioned segmented deformable mirror by using multimorph cantilever actuators that are made of ceramics or relaxor ferroelectric single crystal.

This invention is also resulted from the realization that the actuation performance of the piezoelectric/electrostrictive cantilever actuators that are made of ceramics or relaxor ferroelectric single crystal materials in driving the motion of a deformable mirror, can be further improved by using a force-enhancement scheme, a travel range extension method, and combination thereof.

In one aspect, the invention related to a method of providing a force-enhanced cantilever actuator to drive the motion of a continuous-face-sheet deformable mirror with improved actuation force and extended travel range.

In another aspect, the invention related to a method of providing a force-enhanced cantilever actuator to drive the motion of a segmented deformable mirror with improved actuation force and extended travel range.

In one aspect, the invention related to a method to extend the travel range of a cantilever actuator in actuating the motion of a continuous-face-sheet deformable mirror.

In another aspect, the invention related to a method to extend the travel range of a cantilever actuator in actuating the motion of a segmented deformable mirror.

In yet another aspect, the invention related to a method to combine both force enhancement and travel range extension skills to improve the actuation performances of cantilever actuators in driving the motion a continuous-face-sheet deformable mirror.

In yet another aspect, the invention related to a method to combine both force enhancement and travel range extension skills to improve the actuation performances of cantilever actuators in driving the motion a segmented deformable mirror.

This invention is also resulted from the realization that a single crystal based deformable mirror system having superior system reliability, stability, durability, and long life time, can be constructed by using relaxor ferroelectric single crystals in combination with other single crystal materials such as single crystal silicon.

Thus, it is a further object of this invention to provide a reliable material system for building the deformable mirror to ensure reliable operation for long time run.

In another aspect, the invention relates to a method of manufacture of the continuous-face-sheet deformable mirror by hybrid integrating and wafer-level transferring the piezoelectric/electrostrictive cantilever actuator array onto a base substrate. In one embodiment, the base substrate is an ASIC driver substrate on which a metal bonding interface layer is pre-defined to provide a full mechanically support and meanwhile enable electrical communications to the cantilever actuator. In another embodiment, an ASIC driver substrate on which a metal bonding interface layer is pre-defined to provide a partial mechanically support and meanwhile enable electrical communications to the cantilever actuator.

In another aspect, the invention relates to a method of manufacture of the segmented deformable mirror by hybrid integrating and wafer-level transferring the piezoelectric/electrostrictive cantilever actuator array onto a base substrate. In one embodiment, the base substrate is an ASIC driver substrate on which a metal bonding interface layer is pre-defined to provide a mechanical support and meanwhile enable electrical communications to the cantilever actuator. In another embodiment, an ASIC driver substrate on which a metal bonding interface layer is pre-defined to provide a partial mechanically support and meanwhile enable electrical communications to the cantilever actuator.

BRIEF DESCRIPTION OF THE DRAWINGS

FIG. 15G-I are cross-sectional views of the PMN-PT/SOI composite substrate after being further patterned in its conductor layer 1052, adhesive layer 1053, and the device silicon layer 1007 plus box layer 1004, respectively.

DETAILED DESCRIPTION OF THE INVENTION

To provide an overall understanding of the invention, certain illustrative embodiments will now be described, including actuators and methods for controlling deformable mirrors. However, it will be understood by one of ordinary skill in the art that the systems and methods described herein may be adapted and modified as is appropriate for the application being addressed and that the devices and methods described herein may be employed in other suitable applications, and that such other additions and modifications will not depart from the scope hereof.

Figure 1:
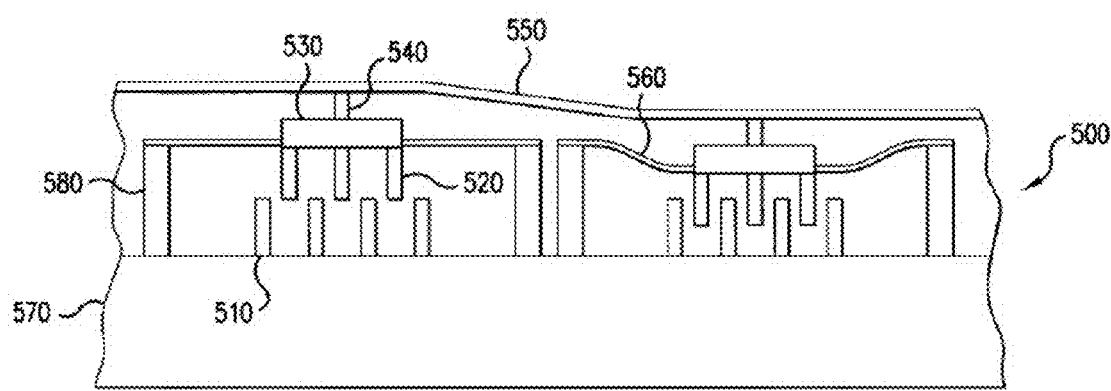
FIG. 1 is a cross-sectional view of a prior art deformable mirror in attachment with comb actuators (Prior Art).

As discussed in the Background section above, the prior art MEMS deformable mirror membrane 550 shown in FIG. 1 (see U.S. Pat. No. 6,384,952) is equipped with electrostatic comb actuators 500. The actuators 500 include stator 510 and sliders 520. The sliders 520 are integrated with a slider top 530. Posts 540 attach the slider 520 via the slider top 530 to the deformable mirror membrane 550. Each post 540 will pull on the mirror 550 with the strength of the actuator force that is controlled by the amplitude of the applied voltage. The result is the gradually curved dimple as shown in FIG. 1, allowing the variation in the surface from one actuator to the next to be smooth.

As also delineated in the Background section above, this design has several shortcomings. Because of the requirement of placing teeth set of stators 510 and sliders 520 precisely relative to each other, the manufacturing process for the DM is unduly complicated. Also, due to the electrostatic actuation, the device does not offer high actuation force comparable to that provided by piezoelectric actuators.

Figure 2:
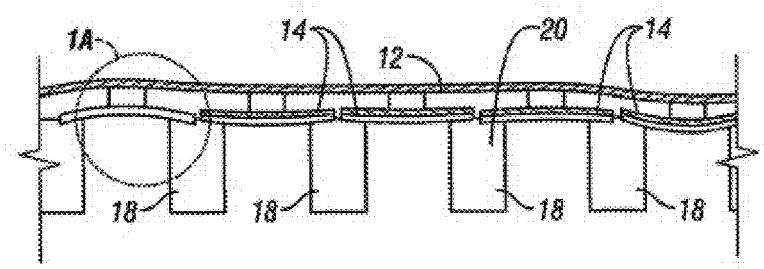
FIG. 2 is a simplified side cross-sectional view of a deformable mirror according to U.S. Pat. No. 7,336,412. (Prior Art)
Figure 2A:
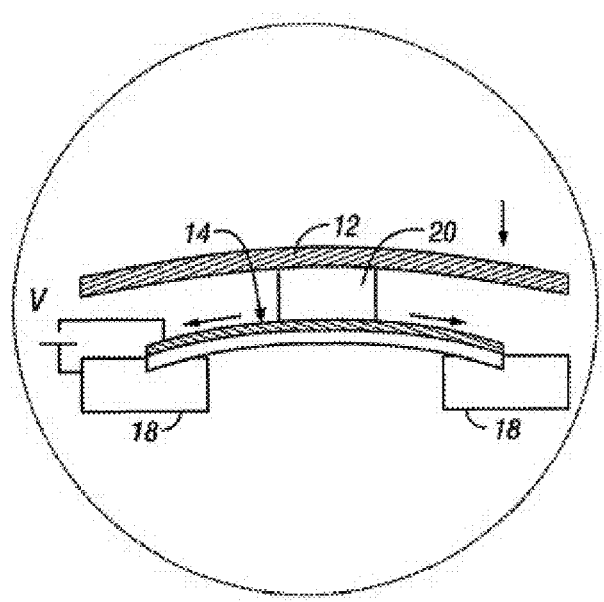
FIG. 2A is the enlargement view of a single actuator 14 coupled to a segment of the mirror membrane 12 according to U.S. Pat. No. 7,336,412. (Prior Art)

As also discussed in the Background section above, the prior art U.S. Pat. No. 7,336,412 is enclosed herein as another reference. The patent discloses a deformable mirror device actuated by an array of piezoelectric actuators, for which FIG. 2 provides a simplified side sectional view of the disclosed deformable mirror. The deformable mirror comprises of a transferred continuous membrane mirror 12 supported by a plurality of individually controllable microactuators 14. Each microactuator 14 is comprised of a thick PZT film disposed on a micromachined support 18. Mirror membrane 12 in turn is connected by a micromachined pedestal 20. A voltage applied to the piezoelectric layer induces stress in a longitudinal direction in the layer causing it to deform and pull on mirror 12 connected to it through indium pedestal 20. Thus, small strains obtainable in a piezoelectric material at modest voltages are translated into large displacements, as shown in FIG. 2A, the enlargement view of a single actuator 14 coupled to a segment of the mirror membrane 12.

This prior art design has a few technical limitations. As shown in FIG. 2 and FIG. 2A, each microactuator 14 is mechanically clamped along its boundary, and enclosed within the boundary is a suspended continuous PZT membrane with no cut or opening. To transfer the motion of the film to the top mirror membrane 12, a single pedestal member 20 is disposed at or near the center of each of the continuous PZT membranes. Since the suspended PZT membrane is a continuous membrane, being clamped along its boundary, its capability in amplifying displacement is significantly restricted. Furthermore, due to the sol-gel technique used for forming the thick PZT film, the fabrication process of the deformable mirror is complicated in that many spin-on coating steps are required to deposit a thick film. Also, due to the polycrystalline phase of the piezoelectric thin-film, the electro-mechanical performances of the actuator are not satisfactory. Besides, the high post-annealing temperature (>500° C.) of the thin-film process makes it problematic for direct manufacturing of the patterned actuator structures onto a CMOS drive substrate.

Figure 3:
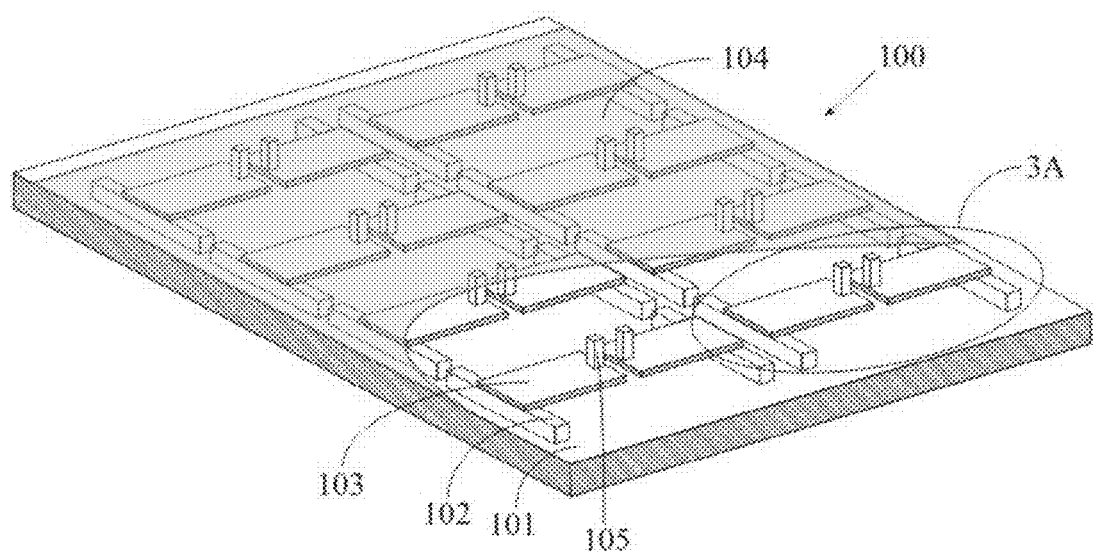
FIG. 3 is a conceptual isometric view of a deformable mirror device having an illustrative 2×4 pixel array according to an illustrative embodiment of the present invention.

Referring now to FIG. 3, a conceptual isometric view of a deformable mirror device 100 according to an illustrative embodiment of the present invention, includes a substrate 101, a plurality of spacers 102 disposed on the substrate, plurality of cantilever microactuators, in particular, a plurality of cantilever assemblies 103 disposed on the plurality of spacers 102, and a continuous deformable membrane 104 disposed on the plurality of the cantilever assemblies 103. Each of the cantilever assemblies comprises a supporting portion 120 in contact with the respective spacer, a beam portion 121 extending a respective length over the substrate, and equipped at the beam distal end a post member 105, as shown in FIG. 3C. The deformable membrane 104 can be made of materials including single crystal silicon, polysilicon, silicon carbide, silicon nitride, metals, and polymers, and optical coating layer(s) can be deposited on the deformable mirror in order to enhance the optical performances of the mirror surface. In controlling the shape of the deformable membrane 104, the plurality of the cantilever microactuator assemblies is formed into a two dimensional pixel map through which each membrane mirror portion (or in other words, pixel) is assigned underneath at least a group of cantilever microactuator(s) as its motion generator. Accordingly, the distribution of the actuator array on the substrate 101 can be designed as square, rectangular, hexagonal, triangular, and any other geometries depending on the pixel size, array size, the mirror aperture, field of view, and the wavefront aberrations to be corrected by using the deformable mirror device 100.

Figure 3A:
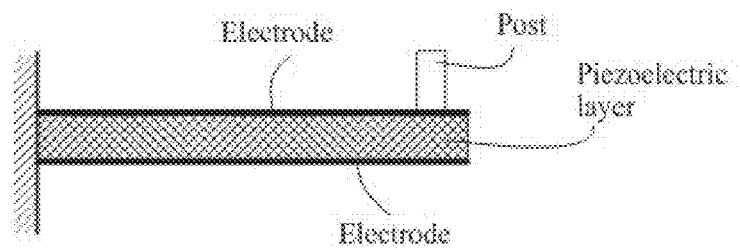
FIG. 3A is a cross sectional views of the layered structure for an electrode-coated cantilever unimorph used as the cantilever assembly in FIG. 3.

According to the present invention, in some preferred embodiments, the cantilever actuator assembly in FIG. 3 is an unimorph cantilever actuator in which only one (1) electrode-coated piezoelectric/electrostrictive layer is used to build the cantilever assembly, as shown in FIG. 3A. It is understood that the term "unimorph" as is used in the present invention specifically refers to the cantilever actuator having one single piezoelectric/electrostrictive layer, as shown in FIG. 3A.

Figure 3B:
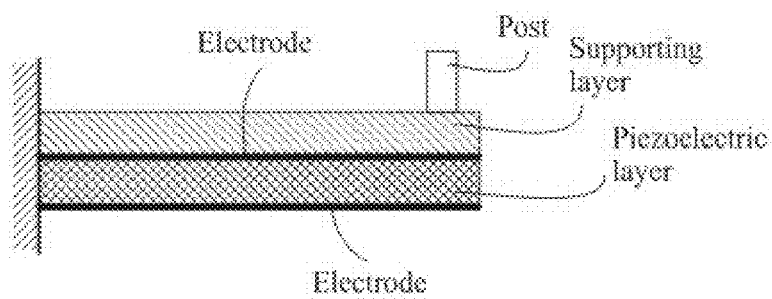
FIG. 3B is a cross sectional views of the layered structure for an electrode-coated cantilever bimorph used as the cantilever assembly in FIG. 3.
Figure 3C:
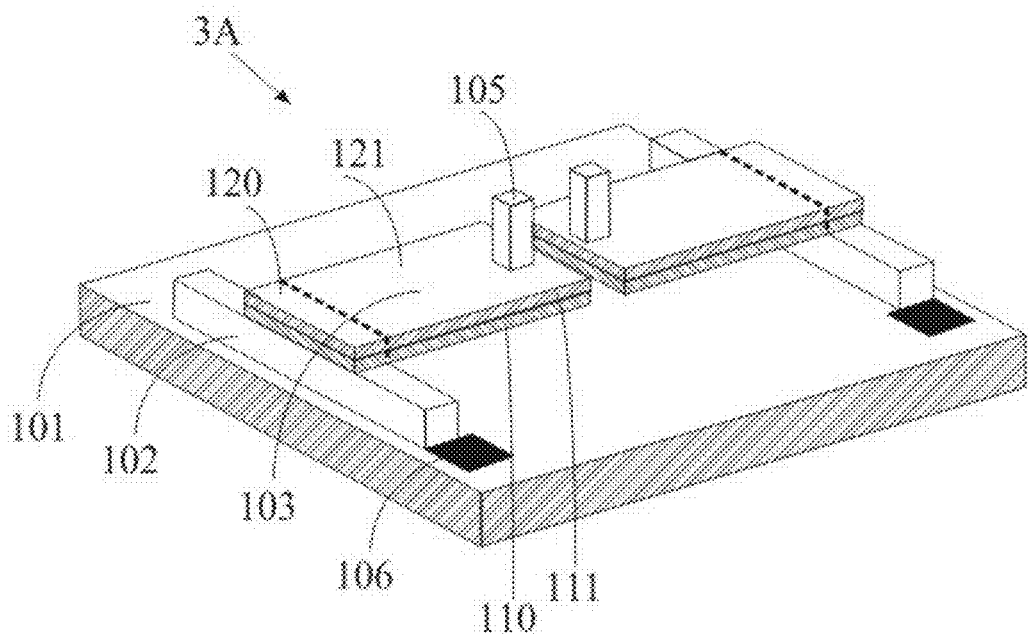
FIG. 3C is an enlarged view of a pair of the cantilever actuators being assigned to actuate one pixel of the deformable mirror device.

In accordance with the present invention, in some other preferred embodiments, the cantilever actuator is a bimorph cantilever actuator in which one (1) electrode-coated piezoelectric/electrostrictive layer is used in combination of one (1) supporting layer to form the cantilever assembly, as shown in FIG. 3B.

In some other embodiments, the cantilever actuator is a multimorph cantilever microactuator in which one (1) layer of electrode-coated piezoelectric/electrostrictive film is used in combination of at least two (2) separate material layers to form the cantilever actuator assembly.

Referring now to FIG. 3C, an enlarged conceptual isometric view of a pair of the piezoelectric cantilever actuators disposed on a base substrate, and each of the cantilever assemblies comprises a supporting portion 120 disposed atop of the respective spacer 102, a beam portion 121 extending a respective length over the substrate, and equipped at the beam distal end a post member 105. The dashed line overlaid on the cantilever assembly 103 depicts the bounds of the portions 120 and 121. In this preferred embodiment, the pixel actuator cell 3A includes two cantilever actuator assemblies 103, and each of which may be independently controlled by applying varied voltage to the electrode 106. By having two cantilever actuator assemblies 103 per pixel, a deformable mirror device can couple displacement from both actuators per pixel.

Depending on application requirements, each pixel of the deformable mirror device can be designed to be actuated by using either one (1) cantilever actuator, two (2) cantilever actuators, three (3) cantilever actuators, four (4) cantilever actuators, or more than four (4) cantilever actuators.

Depending on the application needs, the spacer 102 can be either electrically conductive or non-conductive.

In the preferred embodiment as shown in FIG. 3C, each actuator 103 comprises of a piezoelectric/electrostrictive film 110 disposed on a micromachined support 102, and in establishing a piezoelectric/electrostrictive bimorph cantilever, a second material layer 111 is used in mating with this first piezoelectric/electrostrictive film 110.

The piezoelectric/electrostrictive film 110 can be made of any piezoelectric/electrostrictive material. In a preferred embodiment, the film 110 is a relaxor ferroelectric single crystal material such as lead manganese niobate lead titanate (PMN-PT) single crystal. Relaxor ferroelectric single crystal such as piezoelectric lead manganese niobate lead titanate (PMN-PT), lead zinc niobate-lead titanate (PZN-PT), and relaxor lead magnesium niobate-ferroelectric lead zirconate titanate single crystals (PMN-PZT), Lead lanthanum zirconate titanate (PLZT), are a new generation of piezoelectric materials possessing prominent properties and are poised to advance piezoelectric applications. The attractiveness of these materials lies in the fact that their piezoelectric coefficients electromechanical coupling factor and strain levels are significantly higher than those of conventional lead zirconate titanate (PZT) materials. Unlike piezoceramic and sol-gel film piezoactuators that employ strain magnification schemes, single crystal actuators can deliver higher strain levels without sacrificing generative force. Further, the low strain hysteresis and the stability of single crystals result in improved controllability for piezoactuators.

The second material layer 111 can be any mechanical material. In a preferred embodiment, the second material layer 111 can be the same material as the piezoelectric/electrostrictive film. In another preferred embodiment, the second material layer 111 can be single crystal silicon material.

Figure 4A:
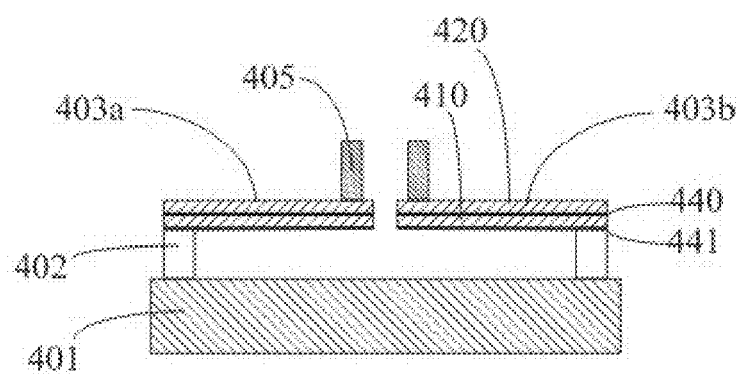
FIG. 4A is a schematic view of an actuator cell consisting of relaxor ferroelectric single crystal bimorphs and the post element.
Figure 4B:
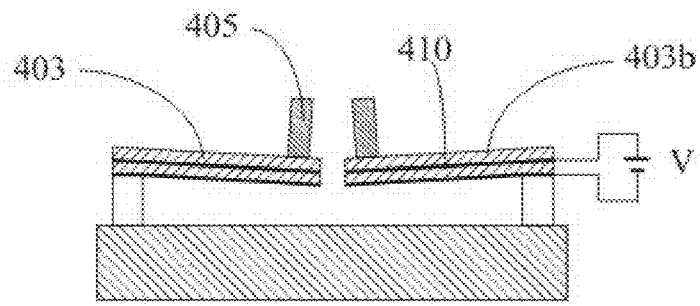
FIG. 4B is a schematic view of the actuator cell in FIG. 4A at the activated state showing that the constrictive displacement generated by the relaxor ferroelectric crystal layer is converted to a normal (vertical) deflection.

FIG. 4A shows the cross sectional view of an individual actuator cell comprising two (2) bimorph actuators 403a and 403b that are made of relaxor ferroelectric single crystal material. The spacer structure 402 is disposed on the substrate 401 to provide support for the actuator cell. In this preferred embodiment, the entire actuator cell (comprising a pair of bimorph actuators 403a and 403b) is responsible for actuating one pixel portion for a deformable mirror device. Each of the bimorph cantilever actuators comprises of a relaxor ferroelectric single crystal layer 410 and a mechanical supporting layer 420. The bimorph layer 410 is coated with two electrodes 440 and 441 to enable electrical connection to a power source. Each of the bimorph members of the actuator cell has a post element 405 located near the movable distal end. Depending on the dimensional sizes and elasticity of the post element, the post can be either rigid or resilient during an actuation process. Depending on applications, the post can be either electrical conductive or non-conductive. The supporting layer 420 can be made of any material by either bonding or depositing a thin film onto the active layer 420. In this preferred embodiment, as shown in FIG. 4B, only the layer 410 is biased in operation while the other layer 420 remains passive. However, in order to enhance the actuation force, the layer 420 can also be chosen as a piezoelectric/electrostrictive material in some other preferred embodiments, acting as a second active layer in actuating the deformable mirror device. In such a manner, different voltages can be applied to the layers 410 and 420 to cause one layer to extend and the other to contract, respectively, and as a result, the travel range of the cantilever deflection is extended.

FIG. 4B shows an actuator cell at the activated state, wherein only one active layer is in use. With an applied voltage V, a small constrictive displacement is generated in the active relaxor ferroelectric layer, which is converted to a normal (vertical) displacement on the sampling post. Utilization of array of the relaxor ferroelectric actuator allows a compact, low cost, low voltage, and fast response actuation system for precise driving large aperture deformable mirrors.

As can be seen from FIG. 4A and FIG. 4B, the actuator concept is based on the piezoelectric and/or electrostrictive bimorph effect instead of thermal bimorph effect. Furthermore, to enhance the thermal stability of the actuator, the supporting layer 420 of the bimorph actuator 403 can be selected as the same material as that of the active layer 410. Because the support layer provides an identical thermal expansion coefficient, the thermal bimorph effect is effectively quenched in the actuator design.

It is also understood that the bimorph effect of the cantilever bimorph structure (single-side fixed) is far more profound (for example, 5~20 times better) than that of a double-clamped bimorph beam. The later does not offer significant vertical deflection because of its symmetrically clamped boundary conditions and thus the restrained motion along the lateral plane.

Figure 5:
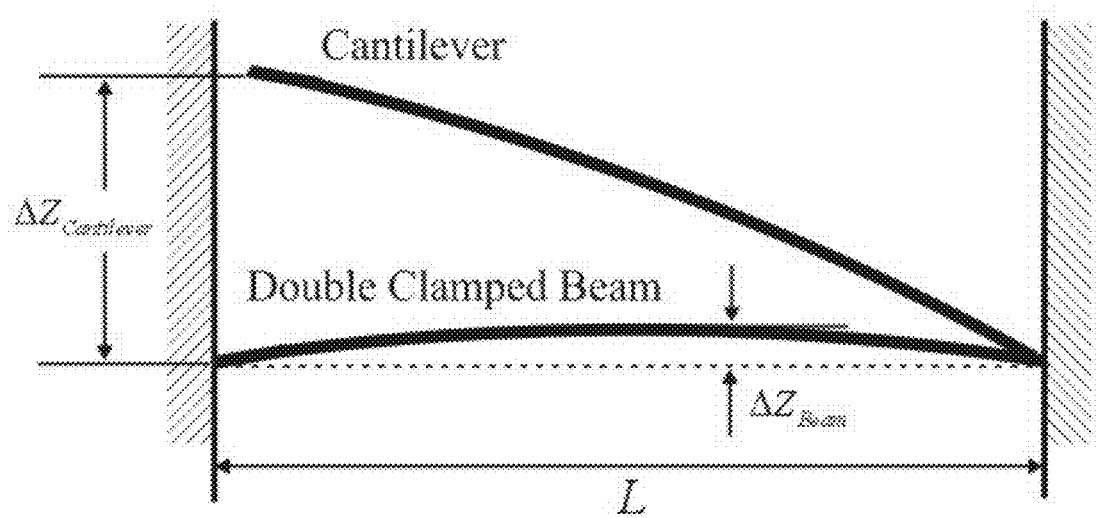
FIG. 5 is an illustrative view of the deformed shapes for two groups of actuators having different boundary conditions, showing that the bimorph cantilever actuator is able to generate larger deflection than the double-clamped beam actuator.

Comparing the performance of the cantilever bimorph to that of a double-clamped bimorph, FIG. 5 provides an illustrative view of the deformed shapes typically for both cantilever bimorph and double-clamped beam bimorph. Given the same cell length L and at the same actuation voltage, it is shown that the cantilever actuator is able to generate a deflection $\Delta Z_{Cantilever}$ significantly larger than that of the double-clamped beam actuator $\Delta Z_{Beam}$. Depending on the actuator dimensions and elastic properties, $\Delta Z_{Cantilever}$ can be up to 30 times that of $\Delta Z_{Beam}$. For example, given an actuator length of 500-µm at 200V actuation voltage, it is analytically calculated that a bimorph actuator comprising of a 50-µm thick PMN crystal layer and a 5-µm silicon layer is capable of providing ~7.16-µm tip deflection, significantly larger than the 0.45-µm deflection that is calculated for the double-clamped beam actuator.

Figure 6:
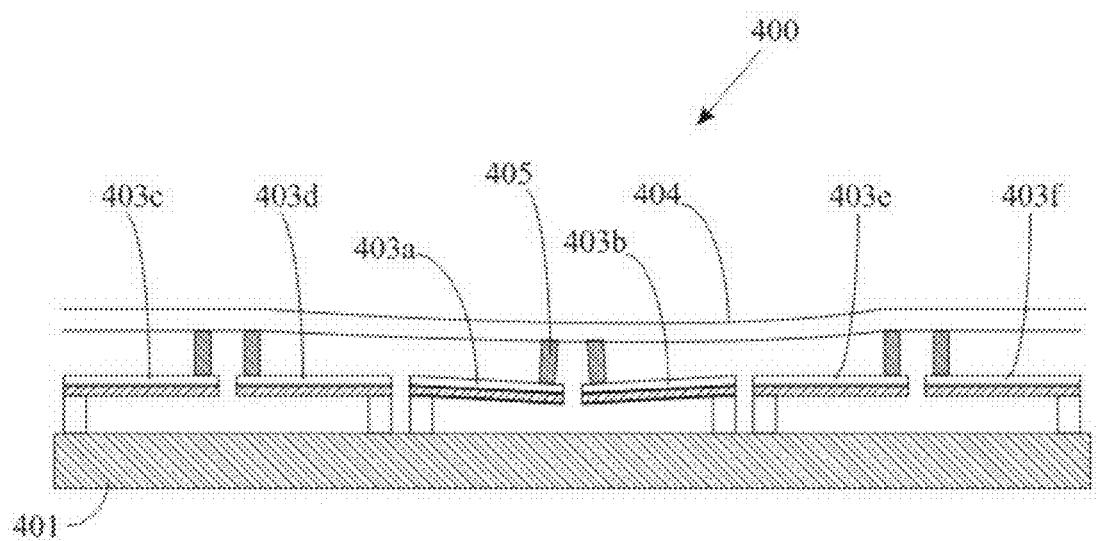
FIG. 6 is a cross sectional view of an illustrative deformable mirror device actuated by an array of cantilever assemblies comprising of relaxor ferroelectric bimorph cantilever actuators.

Now referring to FIG. 6, a cross sectional view of an illustrative deformable mirror device 400 built on a substrate 401. The device is actuated by array of cantilever assemblies comprising of a relaxor ferroelectric single crystal (e.g. PMN-PT) based bimorphs 403a-403f. The device utilizes an array of center-positioned linking posts 405 in the middle of each flexural cantilever elements as a joint link between array of microactuators 403a-403f and the deformable mirror faceplate 404. In the deformable mirror device 400, cantilever assemblies 403a and 403b are in the activated state, being deformed by the same actuation voltage, and allowing the attached membrane portion to deform. Cantilever assemblies 403c, 403d, 403e, and 403f, are in the open state. The displacement at the sample posts causes a spread distribution of deformation on the local pixel and its neighborhoods governed by the motion transfer and influence function, as shown in FIG. 6. By selectively setting the states of the cantilever assemblies 403a-403f, the deformable mirror device 400 can be utilized to form a deformed shape for the mirror faceplate 404. In so doing, the invention may optionally include electronic circuits embedded in the substrate 401 for the purpose of addressing the individual actuators and/or sensing the state of a given mirror segment.

In contrast to other electrostatic actuation based MEMS actuation approaches for driving deformable mirrors, such actuator-pixel pair design in accordance with the present invention is established as a "position" actuator". This feature is enabled by the large force and high stiffness of the relaxor ferroelectric single crystal (e.g. PMN-PT) cantilever actuators. Compared to single crystal Si electrostatic actuator DM technology, this single crystal piezoelectric actuator design is superior in its capability of being robust, high energy density, high stiffness, high bandwidth, lower driving voltage, lower influence function, immunity to undesirable lateral motion modes, and without Si spring tilting and lateral stiction problems. Compared to conventional PZT piezoelectric actuator DM technologies, the attractiveness of our MEMS DM approach lies in the fact that it offers 4-20 times piezoelectric properties improvement without employing strain magnification schemes. The approach is also superior in its lower hysteresis and high electro-mechanic stabilities due to the nature of the single crystals. Furthermore, compared to the flextensional actuator that also utilizes the relaxor ferroelectric single crystal piezoelectric material, the bimorph cantilever design represents a much simple structure with straightforward manufacturing and being involved with less process steps.

Instead of the bimorph cantilever actuator as used in FIG. 6, the cantilever actuator for actuating a deformable mirror device can be configured as unimorph cantilever as well in accordance with the present invention. Only one electrode-coated piezoelectric layer is utilized in the cantilever actuator assembly, and in this case, there is no second supporting layer in direct mating (or in direct contact) with the piezoelectric layer.

Figure 7A:
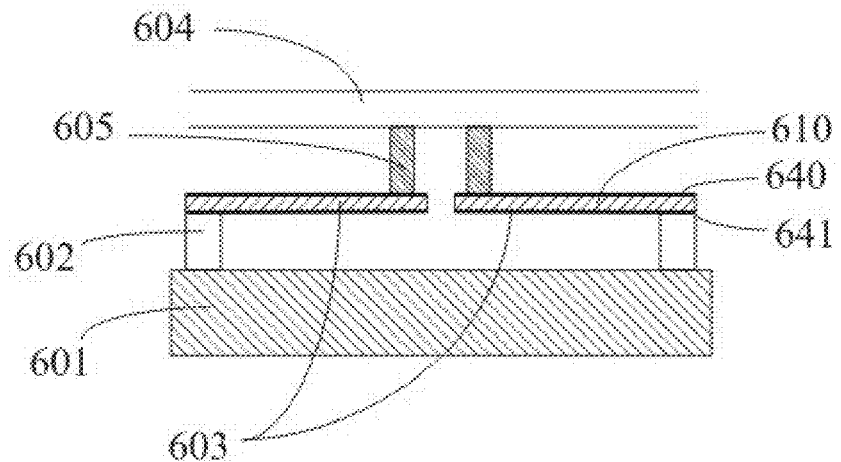
FIG. 7A is a schematic view of an actuator cell consisting of a relaxor ferroelectric single crystal unimorph, a post element, and a mirror portion in attachment.

Referring now to FIG. 7A, a cross sectional view of an individual actuator cell configured for using unimorph actuators, two (2) unimorph actuators 603 are used to deform a mirror portion 604. The actuator is unimorph in the sense that each actuator member 603 is made of only one relaxor ferroelectric single crystal thin film having coated thin-film electrodes 640 and 641 on its opposite surfaces. The electrodes build electrical connection to a power source, and the spacer structure 602 is disposed on the substrate 601 to provide mechanical support for the entire actuator cell. Each of the unimorph members in the actuator cell has at least one post element 605 located near the movable end. Depending on the dimensional sizes and elasticity of the post element, the post can be either rigid or resilient during an actuation process.

By use of the post structures 605 at the distal end of the unimorph cantilever, the mechanical connection is built in between the actuators 603 and the deformable mirror portion 604. In fact, in this preferred embodiment, the portion of the mirror membrane 604 coupled by the post is able to effectively act as the mechanical constrain for the unimorph actuator. Due to the constrain of the post and the associating mirror membrane portion, an in-plane constrictive displacement electrically induced by an actuation voltage in the unimorph layer is thus converted to a normal (vertical) displacement on both the post 605 and its associated mirror portion 604.

Figure 7B:
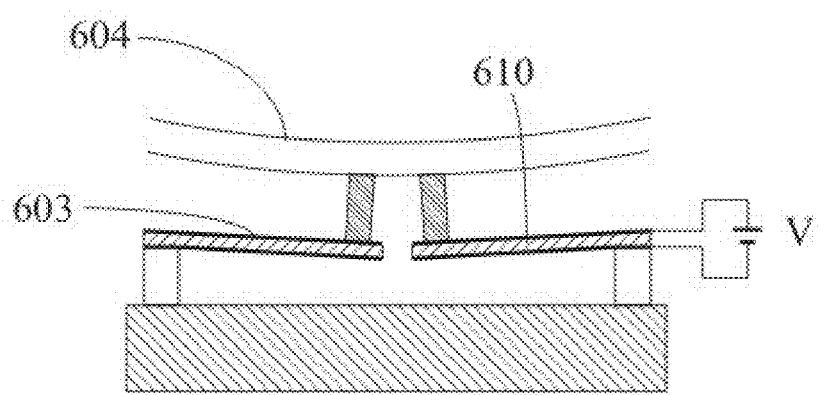
FIG. 7B is a schematic view of the actuator cell in FIG. 7A at the activated state showing that the constrictive displacement generated in the relaxor ferroelectric crystal layer is converted to a normal (vertical) deflection.

FIG. 7B shows the actuator cell at the activated state. With an applied voltage V, a small constrictive displacement is generated in the relaxor ferroelectric layer, leading to a normal (vertical) displacement on the sampling post and its attached mirror portion.

Besides the continuous-face-sheet deformable mirrors, the present invention also include a group of preferred embodiments for the segmented deformable mirrors that can be actuated by the piezoelectric/electrostrictive cantilever assemblies in accordance with the present invention. Different from continuous-face-sheet deformable mirror, a segmented mirror device does not have a continuous face sheet in attachment with its array of the cantilever actuator assemblies. Instead, each segmented mirror portion is mechanically isolated from the adjacent mirror elements in the array.

To provide an overall understanding of the segmented deformable mirrors according to the present invention, certain illustrative embodiments will now be described, including actuators and methods for controlling the segmented mirror devices It will be understood by one of ordinary skill in the art that the systems and methods described herein may be adapted and modified as is appropriate for the application being addressed and that the devices and methods described herein may be employed in other suitable applications, and that such other additions and modifications will not depart from the scope hereof.

Figure 8:
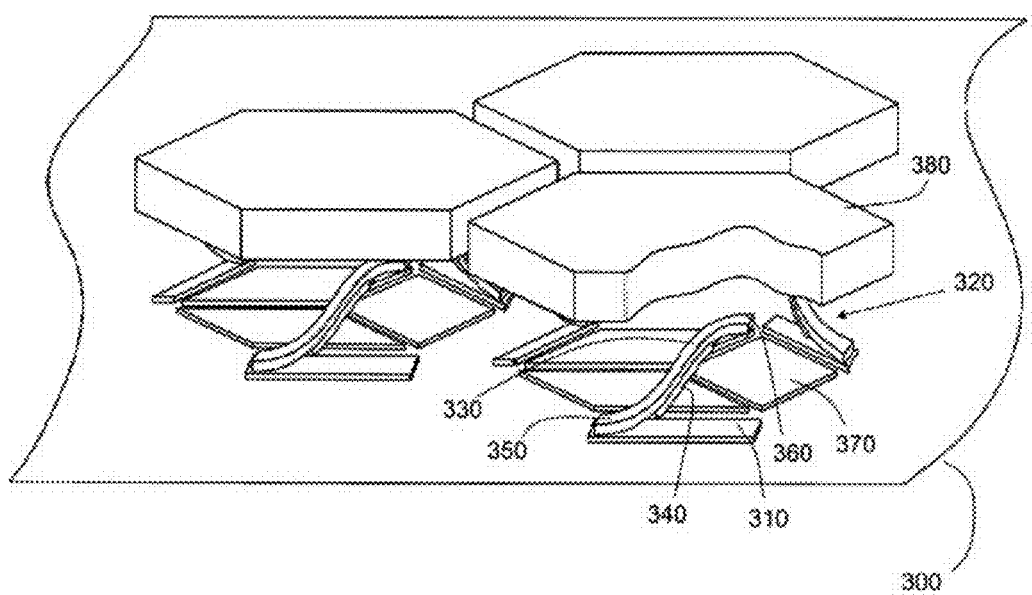
FIG. 8 is a partial cutaway perspective view of a segmented deformable mirror according to U.S. Pat. No. 7,019,434. (Prior Art)

The U.S. Pat. No. 7,019,434 to Helmbrecht (2006), incorporated herein by this reference, discloses an electrostatically-actuated segmented mirror apparatus comprising a substrate and the segmented mirror array elevated above the substrate and supported by curved flexures. As shown in FIG. 8, the segmented mirror is formed on a substrate 300, which may be a silicon wafer or chip containing embedded addressing and sensing circuits (not shown). On top of the substrate 300 are formed a number of control electrodes 370 that are electrically isolated from one another and electrically connected to the embedded addressing and sensing circuits. Disposed around each group of three control electrodes 370, are three conductive ground pads 310, fabricated from the same material as the control electrodes 370. The ground pads 310 are electrically isolated from the control electrodes 370 and electrically connected to a ground plane or to circuits embedded in the substrate 300. Attached to one end of each ground pad 310 is a first anchor portion 350 of a flexure 320. The flexure comprises two layers, a first flexure layer 330 formed from conductive polycrystalline silicon and a second flexure layer 340 formed from silicon nitride. The first anchor portion 350 is both mechanically and electrically connected to the ground pad 310 so that the conductive first flexure layer 330 is held at the same electrical potential as the ground pad 310. The second flexure layer 340 is rigidly attached to the underside of the first flexure layer 330 and extends over a portion of the length of the flexure 320.

Referring again to FIG. 8, the second anchor portion 360 is mechanically and electrically connected to the underside of a mirror segment 380. The mirror segment is any one individual mirror of the segmented deformable mirror device. The mirror segment is electrically conductive and therefore is held at the same potential as the ground pad 310. The mirror segment 380 is hexagonal in shape and is formed from a 20 micrometer-thick layer of single crystal silicon and is coated on its top surface with an optical coating, which may be a highly reflective metal layer. The mirror segment diameter in the first embodiment is on the order of 500 micrometers.

Due to the electrostatic actuators in use, the segmented deformable mirror suffers high actuation voltage. Due to the film deposition process, residual gradient stress unavoidably builds up through the actuator thickness and the post, introducing multiple problems to the actuator including bowing, tilting, position shift in the long run, and sensitivity to the thermal variations. Although efforts can be taken to optimize the residual stresses, the problem remains a significant concern. In fact, stress engineering in thin-film micromachining is usually a time-consuming and labor-intensive procedure. Furthermore, being sensitive to film geometry and thickness designs, the optimized recipe is neither fully transferrable nor scalable to a new actuator design that may have a modified dimension set, film aspect ratio, and/or layout geometry.

Figure 9:
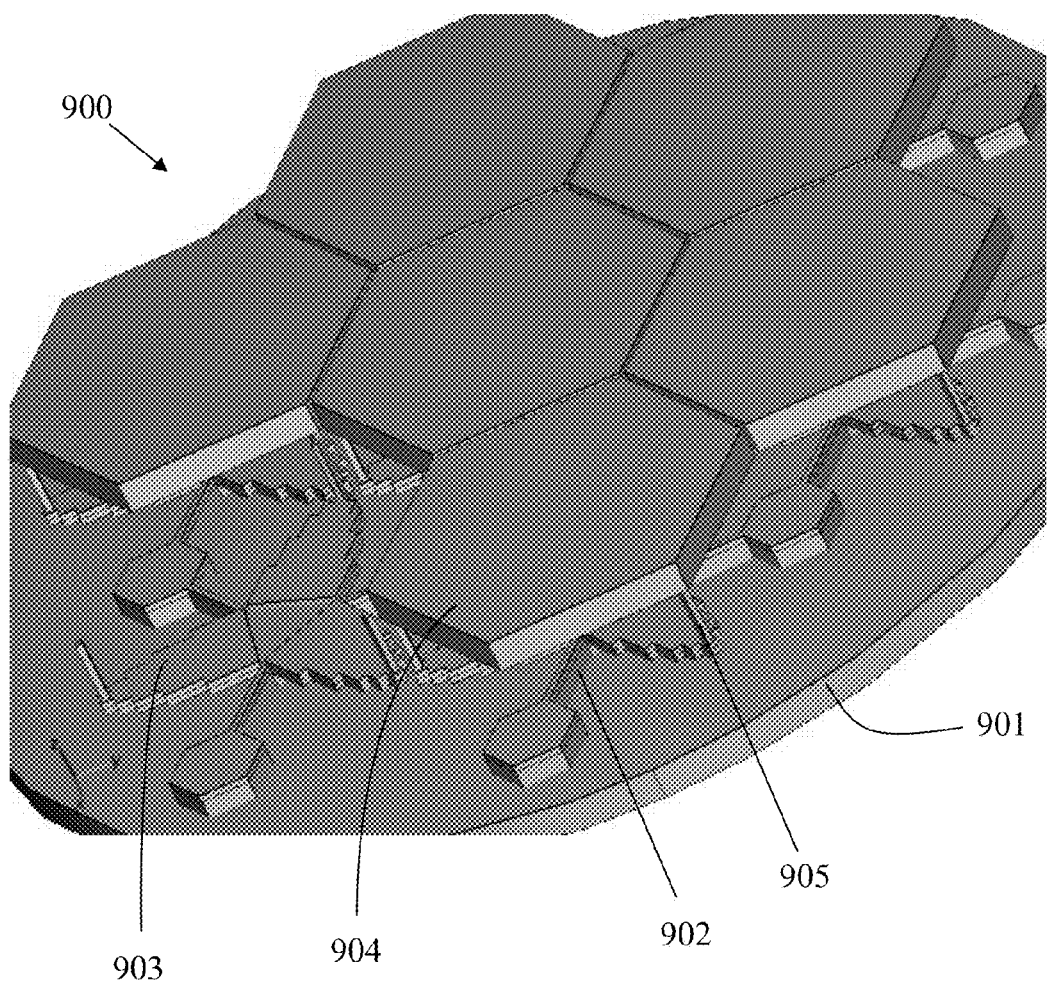
FIG. 9 is a partial cutaway perspective view of a segmented deformable mirror according to an illustrative embodiment of the present invention.
Figure 9A:
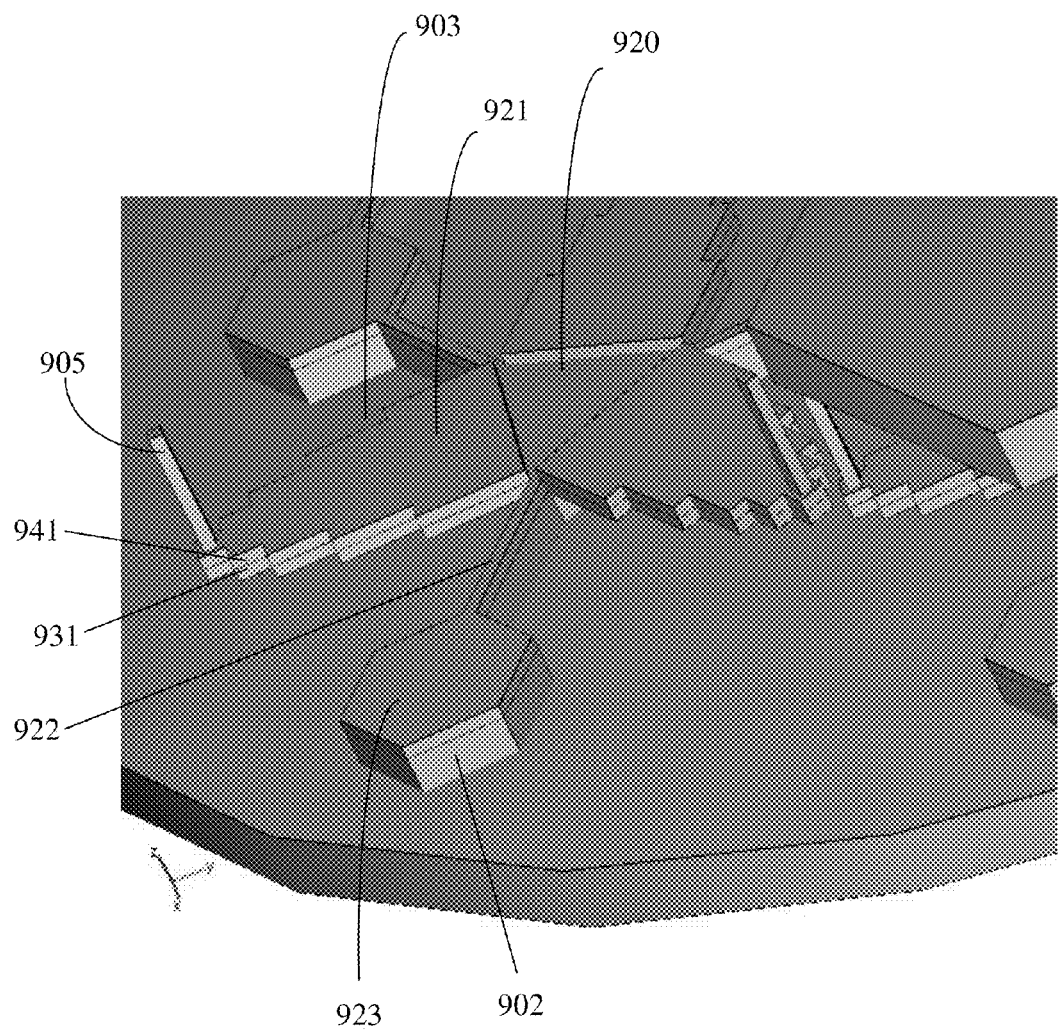
FIG. 9A is an enlarged view of a portion of the piezoelectric cantilever actuator assemblies.

Referring now to FIG. 9, a conceptual isometric view of a segmented deformable mirror device 900 according to an illustrative embodiment of the present invention, includes a substrate 901, a plurality of spacers 902 disposed on the substrate, plurality of cantilever microactuators, in particular, a plurality of cantilever assemblies 903 disposed on the plurality of spacers 902, and an array of the segmented deformable mirror elements 904 disposed on the cantilever assemblies 903. Each of the cantilever assemblies comprises a supporting portion 920 in contact with the respective spacer, a beam portion 921 extending a respective length over the substrate, and equipped at the beam distal end a post member 905, as shown in FIG. 9A. The post member 905 mechanically links the segmented mirror 904 to the cantilever assemblies 903. The segmented mirror 904 can be made of any material including single crystal silicon, polysilicon, glass, silicon carbide, silicon nitride, metals, and polymers, and optical coating layer(s) can be coated on the mirror surface in order to enhance the optical performances of the mirror. In controlling the motions of the segmented mirror 904, the plurality of the cantilever microactuator assemblies is grouped and each group is assigned to one segmented mirror element 904 for controlling its tip-tilt-piston motions. Accordingly, the distribution of the actuator array on the substrate 901 can be defined as square, rectangular, hexagonal, triangular, and any other geometries depending on the pixel size, array size, the mirror aperture, field of view, and the wavefront aberrations to be corrected by using the segmented mirror device 900.

Referring now to FIG. 9A, an enlarged view of a portion of the piezoelectric/electrostrictive cantilever actuator assemblies. Each of the cantilever assemblies 903 comprises a supporting portion 920 disposed atop of the respective spacer 902, a beam portion 921 extending a respective length over the substrate, and equipped at the beam distal end a post member 905. In this preferred embodiment, the pixel actuator cell includes three cantilever actuator assemblies 903, and each of which may be independently controlled. By having three cantilever actuator assemblies 903 per segmented mirror element, a deformable mirror device can couple tip, tilt, and piston motions from the joint motions of the three cantilever assemblies.

However, depending on application requirements, each segmented mirror element can be designed to be actuated by using either one (1) cantilever actuator, or two (2) cantilever actuators, three (3) cantilever actuators, or more than three (3) cantilever actuators.

Depending on the application needs, the spacer 902 can be either electrically conductive or non-conductive.

In this preferred embodiment as shown in FIG. 9A, the supporting portion 920 of the actuator 903 is further extended to have a wall structure 922 connected to a junction port 923.

In this preferred embodiment as shown in FIG. 9A, each actuator 903 comprises of a piezoelectric film 931 disposed on a micromachined support 902, and in establishing a piezoelectric/electrostrictive bimorph cantilever, a second material layer 941 is used in mating with this first piezoelectric film 931.

In this preferred embodiment as shown in FIG. 9A, the supporting portion 920 of the actuator 903, the extended wall structure 922, and the junction port 923, are all defined on the piezoelectric/electrostrictive layer 931. Thus, it is mechanically a continuous piece. Accordingly, the geometric patterns of the spacer 902 can be defined to provide a solid and mechanical supports to all or part of the supporting portion 920, to all or part of the extended wall structure 922, and to all or part of the junction port 923.

The piezoelectric film 931 can be made of any piezoelectric/electrostrictive material. In a preferred embodiment, the piezoelectric film 931 is a relaxor ferroelectric single crystal material such as lead manganese niobate lead titanate (PMN-PT) single crystal and lead zinc niobate-lead titanate (PZN-PT)

The second material layer 941 can be any mechanical material. In a preferred embodiment, the second material layer 941 is the same material as the piezoelectric film. In another preferred embodiment, the second material layer 941 is single crystal silicon material.

In this preferred embodiment as shown in FIG. 9A, this second material layer 941 does not have a portion over or at the junction port 923 such that the piezoelectric/electrostrictive material layer at this junction port 923 is exposed. As such, an electrical connection method can be applied in accordance with the present invention in order to establish electrical connection directly to the electrode of the piezoelectric/electrostrictive (or relaxor ferroelectric crystal) material layer by electrical connecting to the junction port 923.

Figure 9B:
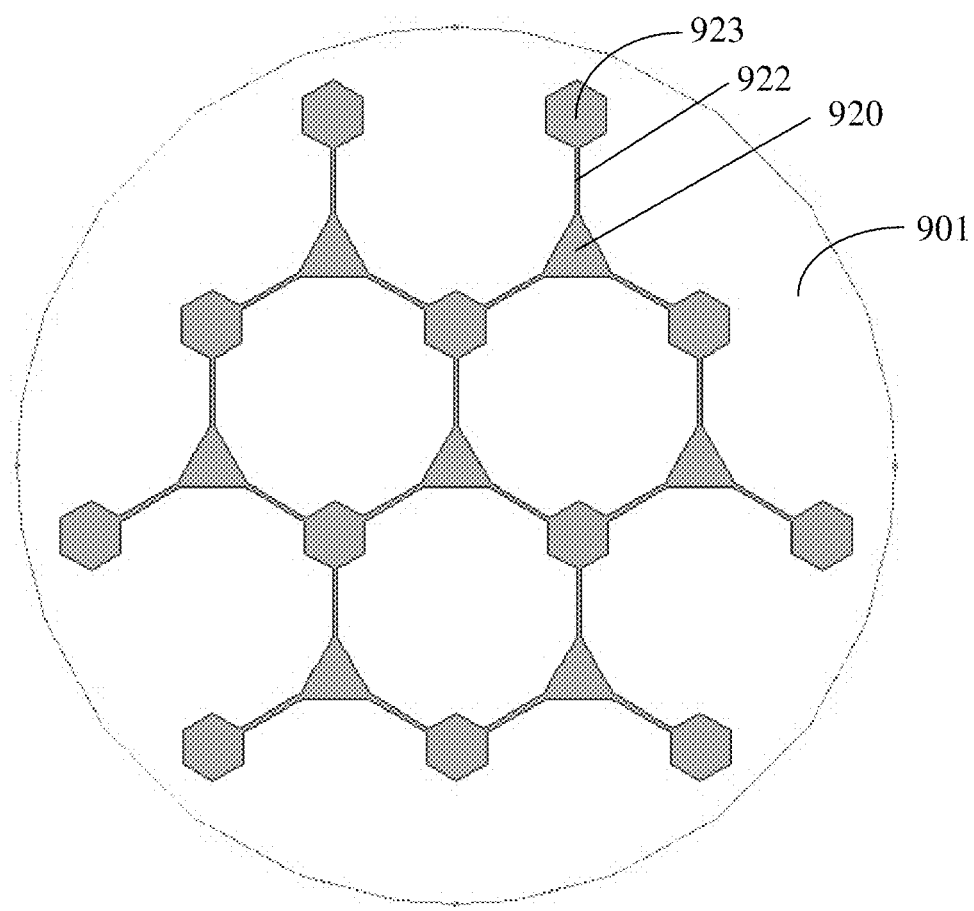
FIG. 9B is a top view of a web pattern illustrating the method of establishing both mechanical and electrical connections through the actuator array in accordance with a preferred embodiment of the present invention.

Depending on the application needs, the supporting portion 920, the wall structure 922, and the junction port 923 in one actuator cell can be connected to those of the same of another actuator cell. A method is used thereof for establishing a common electrical connection for a plural of cantilever assemblies according to the present invention. In the preferred embodiment as shown in FIG. 9B, the supporting portions 920, the wall structures 922, and the junction ports 923 in an array are all interconnected and mechanically a continuous piece, forming a web-like, interconnected pattern of the piezoelectric/electrostrictive layer. In addition to the mechanical connection, a metal coating can be applied onto the interconnected pattern, allowing electrical connection through part of or the entire array. Depending on the application needs, this electrical connection can be used either as a common ground, or as a common port for applying a reference voltage, in accordance with the present invention.

Figure 10A:
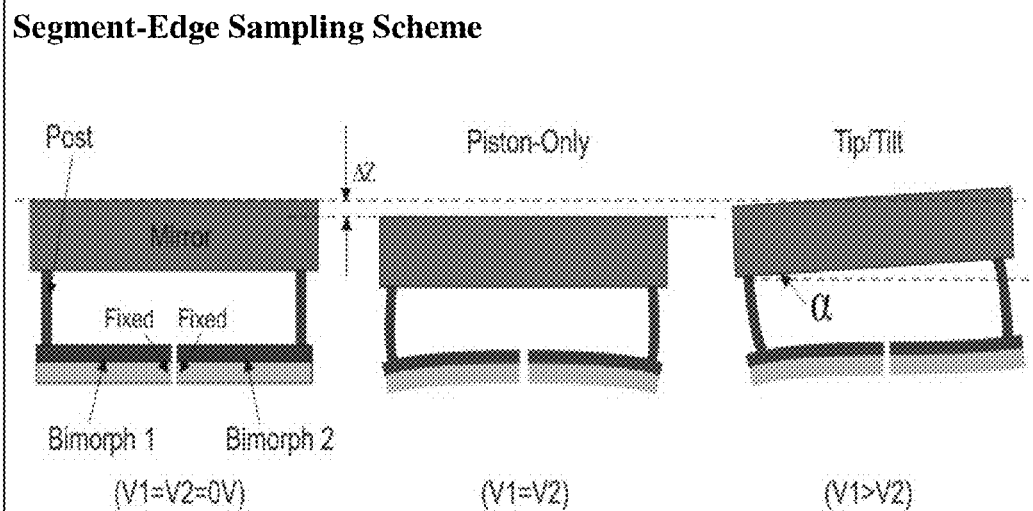
FIG. 10A is a schematic view of two Segmented Tip-Tilt-Piston (TTP) Mirror configurations, either of which consisting of Si/PMN-PT single crystal cantilever bender actuator and the post element.
Figure 10A:
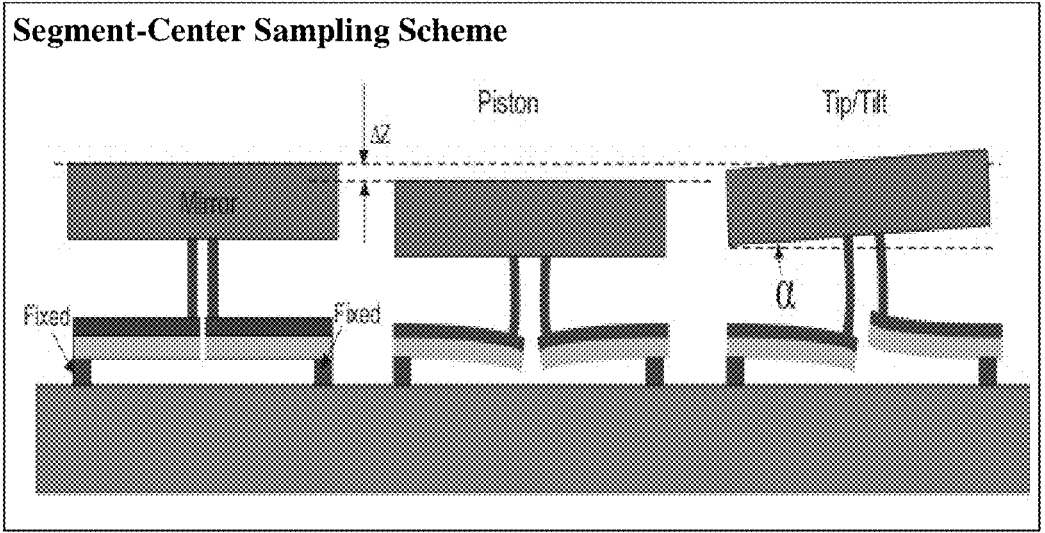

Referring now to FIG. 10A, a cross-sectional view of an illustrative actuator-mirror cell, the cantilever actuator assemblies comprise a single crystal PMN-PT crystal layer in mating with a single crystal silicon layer. The PMN-PT/Si piezoelectric bender is the active element with a flexural post element. In this preferred embodiment, only the PMN-PT layer will be biased in operation while the Si layer acts as a passive support. Alternatively, the passive layer can also be implemented as a second PMN-PT single crystal layer thus providing an identical thermal expansion coefficient. With an applied voltage, a small constrictive displacement is generated in the active PMN-PT layer, which is converted to an angular motion on the sampling post in linkage with the top rigid mirror. Constrained by the top thick mirror, the post also experiences a bending moment, causing a spread distribution of deformation on all posts of the local pixel governed by the motion transfer and influence function. If all bender members of a mirror pixel are simultaneously applied with a same voltage, the mirror undergoes a piston-only motion (see FIG. 10A, V1=V2), and if differential voltage is applied among bimorph members, the mirror receives tilting motion (see FIG. 10, V1>V2). Utilization of array of this actuator cells allows a compact, low cost, low voltage, and fast response actuation system for precise tip-tilt-piston motions for the segmented rigid top mirror array (see FIG. 10). In one preferred embodiment, the post is positioned substantially close to the edge of the mirror segment, thus the segment-edge sampling scheme, and in another preferred embodiment, the post is positioned substantially close to the center of the mirror segment, thus the segment-center sampling scheme, as shown in FIG. 10A.

Figure 10B:
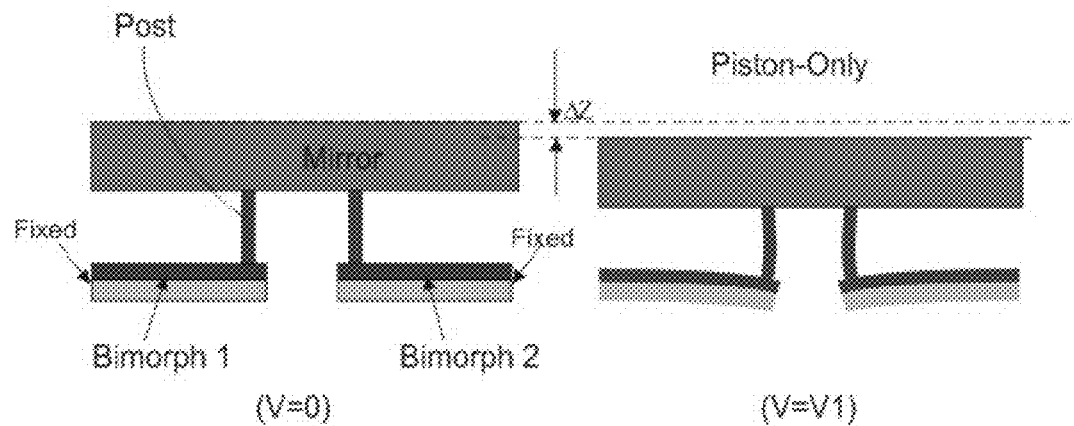
FIG. 10B is a cross-sectional view of a illustrative actuator-mirror cell for generating piston-only motion (or phase-only light modulation in optics) to a rigid mirror.

Referring now to FIG. 10B, a cross-sectional view of a illustrative actuator-mirror cell for generating piston-only (or phase-only light modulation in optics) motion to a rigid mirror, the cantilever actuator assemblies comprise a single crystal PMN-PT crystal layer in mating with a single crystal silicon layer. The PMN-PT/Si piezoelectric bimorph is the active element with a substantially rigid post element located at the bimorph center. In this preferred embodiment, only the PMN-PT layer will be biased in operation while the Si layer acts as a passive support. Alternatively, the passive layer can also be implemented as a second PMN-PT single crystal layer thus providing an identical thermal expansion coefficient. With an applied voltage, a small constrictive displacement is generated in the active PMN-PT layer, which is converted to vertical displacement on the sampling post. Thus, the piston-only motion of the top rigid mirror is achieved.

Figure 10C:
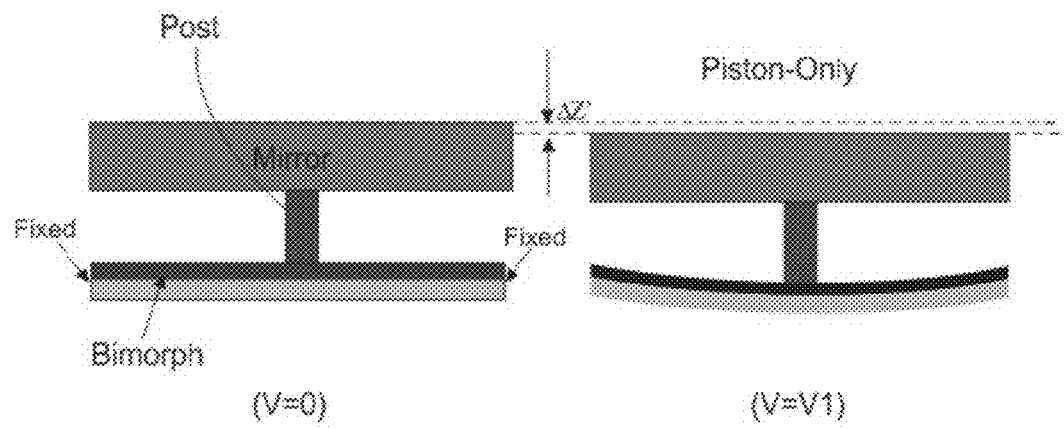
FIG. 10C is a cross-sectional view of a illustrative actuator-mirror cell for generating piston-only motion to a rigid mirror.

To achieve piston-only motion of the top rigid mirror, another preferred embodiment in accordance with the present invention by using relaxor ferroelectric single crystal bimorph as the piston-only motion actuator is illustrated in FIG. 10C, wherein the bimorph is not configured as cantilever actuator, but instead as continuous membrane actuator. Such membrane actuator is mechanically clamped along its boundary. As delineated in FIG. 5, even though the clamped membrane does not offer a stroke as large as its cantilever counterpart, the stroke performance of the clamped membrane actuator by using a layer of relaxor ferroelectric single crystal is still superior to that of clamped membrane actuator by using traditional piezoelectric materials (e.g. PZT). The later usually uses a traditional piezoelectric (e.g. PZT) thin-film as the active element. The clamped membrane actuator in accordance with the present invention is superior to the traditional piezoelectric (e.g. PZT) membrane actuator owing to its superior d31 (or d31, or d51) value over that of a traditional piezoelectric material. As a result, the clamped membrane actuator by using relaxor ferroelectric single crystal as actuation element is also described as a new and useful choice for some applications in accordance with the present invention. These applications include not only using the phase-only mirrors for spatial light modulators and Fabry-Perot interferometer, but also utilizing mirrors having multiple degrees of freedoms such as angular tip motion, angular tilt motion, and combinations thereof, for applications using angular motion mirrors. These angular mirror applications include, without limitations, optical switches, variable optical attenuators, beam steering mirrors, light engines for projector displays, and direct retinal display devices, etc.

Figure 11A:
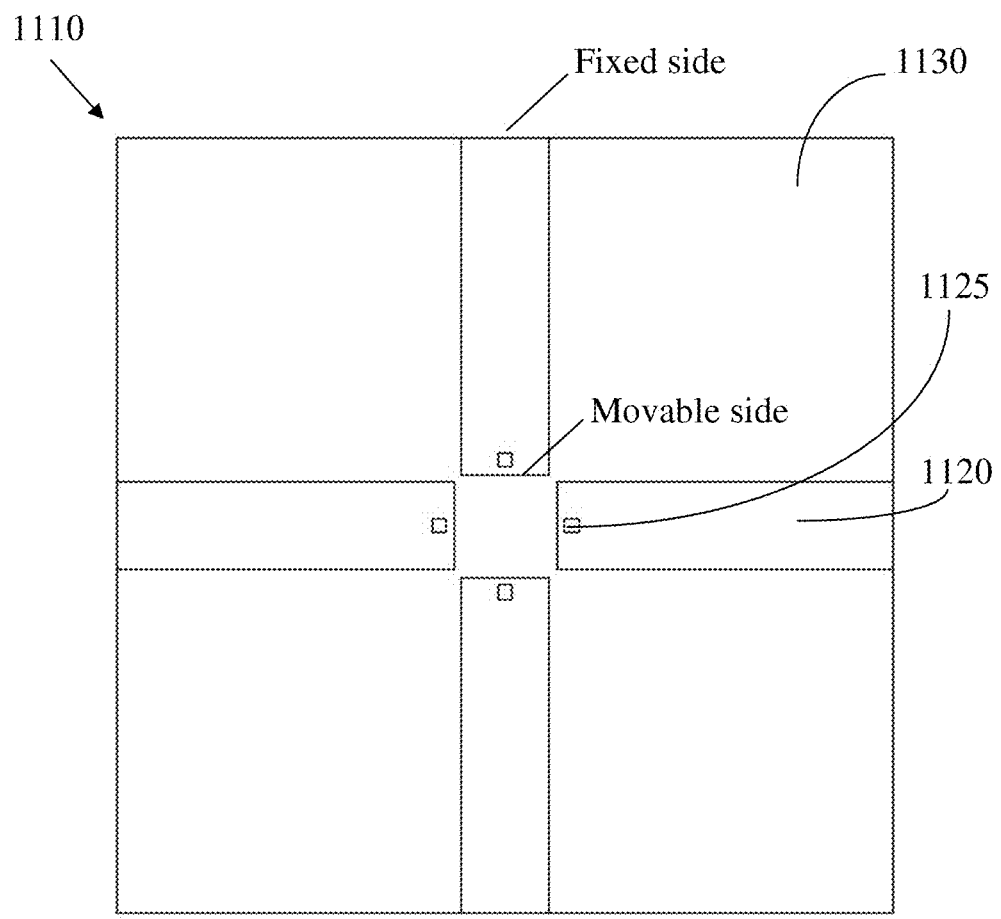
FIG. 11A is a simple bimorph layout design comprising four (4) rectangular breams

Now referring again to FIG. 3B, the cross-sectional view of an exemplary cantilever actuator assembly, the actuator assembly is a bimorph-type cantilever actuator comprising one (1) electrode-coated piezoelectric/electrostrictive layer in mating with one (1) supporting layer, and having one (1) post structure located at the distal end of the bimorph cantilever. By using the bimorph cantilever actuator assembly as the building block, a simple bimorph layout design is given as FIG. 11A, wherein, an actuator cell 1110 for driving motion of a single-pixel segmented mirror portion includes four (4) simple cantilever actuators 1120, each having a post 1125 near or at its distal end, and is designed within a square area 1130, responsible for active control of one square-shaped single-pixel segmented mirror element.

Figure 11B:
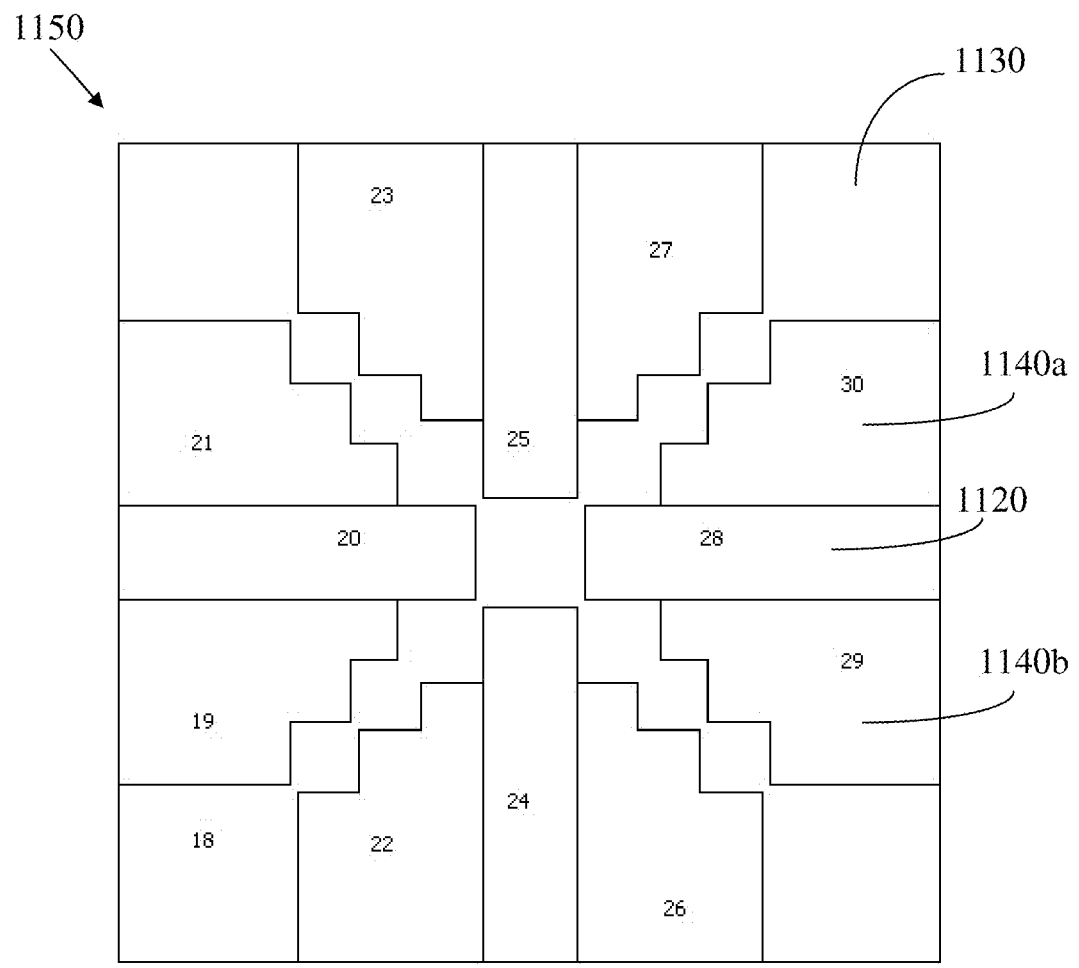
FIG. 11B is an improved bimorph layout design by using the force-enhancement method in accordance with the present invention.

Referring now to FIG. 11B, an improved bimorph layout design 1150 by using the force-enhancement method in accordance with the present invention, is made by implementing additional bimorph areas in attachment with the original simple bimorph beam. In the FIG. 11A design, the layout of each bimorph actuator is a simple rectangular beam, while in the FIG. 11B, the layout of each bimorph actuator has a wing-like structure added along each side of the beam according to an illustrative layout design of the improve bimorph actuator in accordance with the present invention. In this preferred embodiment, the beam 1120 is in linkage with two stepped piezoelectric portions 1140a and 1140b along the two beam sides, respectively. The overall piezoelectric area and material volume participating in the actuation is thus increased, and as a result, the effective piezoelectric force obtained at or near the distal end of the cantilever is also significantly improved, capable of supplying more energy for actuating its mirror segment.

Figure 11C:
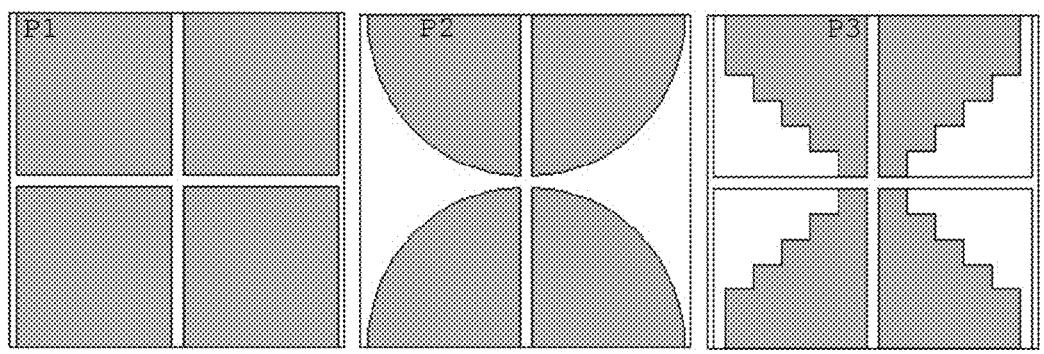
FIG. 11C is the top view for a few bimorph geometric designs by using the force-enhancement method to improve the piezoelectric force of the actuator in actuating either a segmented mirror pixel or a continuous-face-sheet deformable mirror portion in accordance with the present invention.

Other actuator layout designs by using the force-enhancement method are illustrated in FIG. 11C.

FIG. 11C is the top view for a few bimorph geometric designs by using the force-enhancement method to improve the piezoelectric force of the actuator in actuating either a segmented mirror pixel or a continuous-face-sheet deformable mirror portion in accordance with the present invention. The P1 design simply increases the cantilever's area extending its width, the P2 design uses curved features for achieving a more focused force enhancement, and P3 design uses the stepped attachment for achieving a more focused force enhancement.

Figures 12A, 12B:
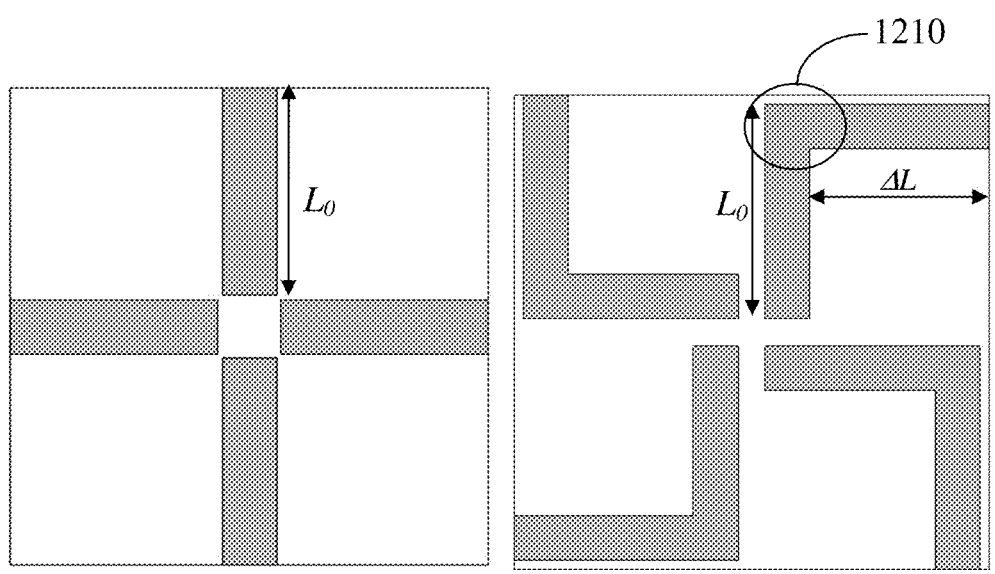
FIG. 12A-B is the top views of two cantilever actuator assemblies used to illustrating the method of travel range extension for driving the motion of the optical mirrors according to the present invention.

Referring now to FIG. 12B, a top view of an illustrative cantilever actuator assembly by using the travel range extension method according to the present invention, the actuator cell comprises four (4) L-shaped bimorph cantilevers. Comparing to the actuator design in FIG. 12A, this cantilever is equipped with a right-angled extension 1210 having an extended length ΔL. In theory, the tip deflection of a piezoelectric bimorph cantilever can be estimated as $$\Delta Z = \zeta |d_{31}| \Delta V \left(\frac{l}{t_1}\right)^2 \quad (1)$$

Where the tip Deflection Coefficient Function is defined as:

$$\xi = \frac{3\left(\frac{E_2}{E_1}\right)\left(\frac{t_2}{t_1}\right)\left(1 + \frac{t_2}{t_1}\right)}{\left[1 - \left(\frac{E_2}{E_1}\right)\left(\frac{t_2}{t_1}\right)^2\right]^2 + 4\left(\frac{E_2}{E_1}\right)\left(\frac{t_2}{t_1}\right)\left(1 + \frac{t_2}{t_1}\right)^2} \quad (2)$$

Which is a function of $$\left(\frac{t_2}{t_1}\right) -$$

bimorph thickness ratio, $$\left(\frac{E_2}{E_1}\right) -$$

Young's modulus ratio, and function of $$\left(\frac{l}{t_1}\right) -$$

the aspect ratio of the piezoelectric active layer.

FIG. 12B is the top views of two cantilever actuator assemblies used to illustrating the method of travel range extension for driving the motion of the optical mirrors according to the present invention, the actuator cell comprises four (4) L-shaped bimorph cantilevers.

Given the same square area, the layout design in FIG. 12B has an extended length for the bimorph, thus capable of an extended travel range proportional to $(L_O+\Delta L)^2$, where $\Delta L$ can be up to $L_O$, and as a result the tip deflection of each bimorph cantilever can be roughly extended to four (4) times that of the original design.

Figure 13:
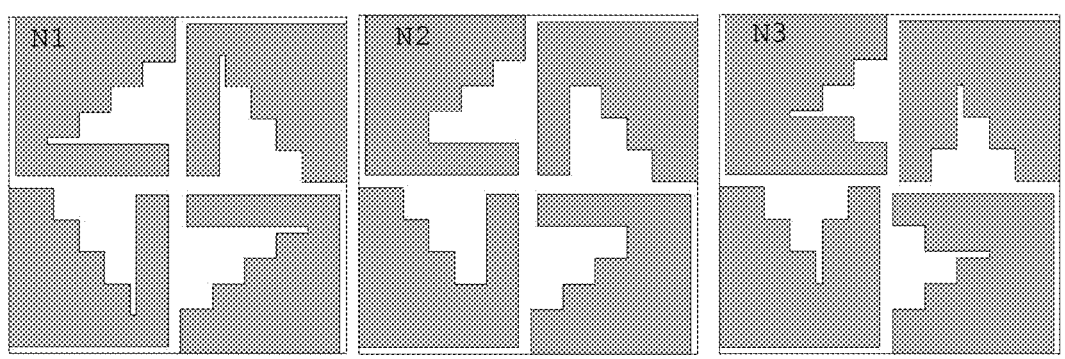
FIG. 13 is three illustrative bimorph configurations that use the travel range extension in combination with the force enhancement skill.

Referring now to FIG. 13, layout designs of three (3) cantilever actuator assemblies illustrating the use of the travel range extension in combination with the force enhancement method for driving the motion of the optical mirrors in accordance with the present invention, device N1 is evolved from the device in FIG. 12B by applying force enhancement method on one cantilever arm, device N2 has a merging piece at the right angle corner such that the vertical motions of the two cantilever arms become partially coupled, and in comparing to device N2, device N3 adds an attachment for force enhancement on its second cantilever arm. Apparently, these actuator assemblies are capable of offering larger tip deflection meanwhile providing an enhanced piezoelectric force. The later is important in that larger actuation force is able to readily overcome the effective stiffness of the post structure, and/or that of the deformable mirror portion should the continuous-face-sheet deformable mirror is to be actuated.

Depending on the application needs for driving the mirror motions in accordance with the present invention, the cantilever bimorph actuators illustrated in FIG. 11A-C, FIG. 12A-B, and FIG. 13 can be implemented for driving both the segmented mirrors (see FIG. 10) and the continuous-face-sheet deformable mirrors (see FIG. 6).

Fabrication Procedure 1000

Figure 14:
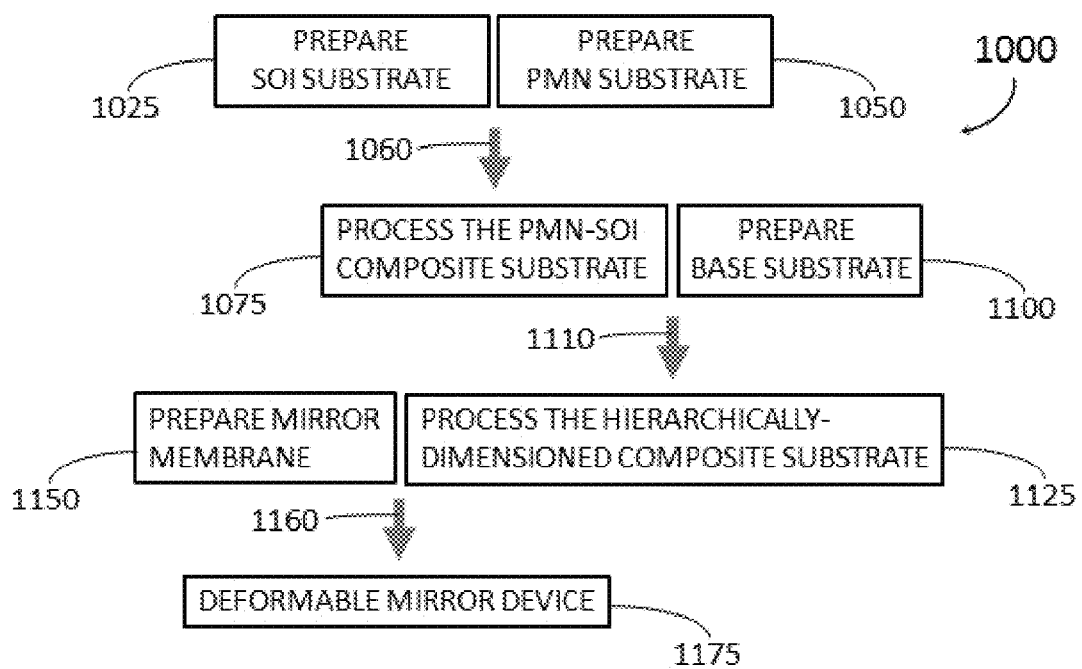
FIG. 14 is one example of a manufacturing process for construction of a MEMS hierarchically-dimensioned continuous-face-sheet deformable mirror device in accordance with the present invention.

FIG. 14 illustrates one example of a manufacturing process or procedure 1000 for construction of a MEMS hierarchically-dimensioned continuous-face-sheet deformable mirror device and the associated single crystal cantilever assembly. The procedure 1000 includes a step 1025 for preparing a SOI (Silicon-On-Insulator) substrate, a step 1050 for preparing a relaxor ferroelectric single crystal substrate, and a step 1060 for bonding the SOI substrate with the relaxor ferroelectric single crystal substrate. The procedure 1000 also includes a step 1075 to continue processing on the bonded composite substrate that is obtained in step 1060. The procedure 1000 also includes a step 1100 for preparing a base substrate, which will be bonded with the aforementioned composite substrate through a step 1110, producing a hierarchically-dimensioned composite substrate. The procedure 1000 also includes a step 1125 to continue processing on the hierarchically-dimensioned composite substrate, a step 1150 to prepare a mirror membrane, and a step 1160 for applying the mirror membrane onto the hierarchically-dimensioned substrate, ultimately producing the deformable mirror device through the step 1125.

Procedure 1000 of FIG. 14 is described below with respect to the formation of a continuous-face-sheet deformable mirror 104. Modifications or alternatives to procedure 1000, as may be appropriate for simplification of the process or for the formation of alternative cantilever actuator assemblies will be discussed later with respect to FIG. 20.

Figure 15A:
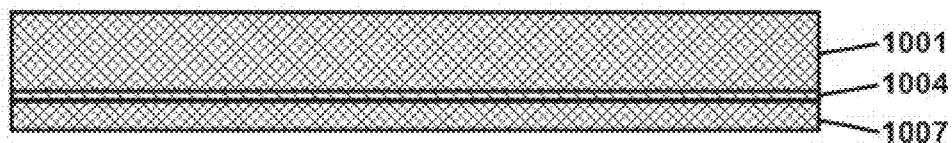
FIG. 15A is the cross-sectional view of a SOI (Silicon-On-Insulator) substrate.

The procedure 1000 begins at step 1025 for preparing a SOI wafer comprising three layers: a base silicon layer 1001, a box oxide layer 1004, and a device silicon layer 1007, as shown in FIG. 15A. The device silicon layer 1007 is the supporting layer that is to be mated with a piezoelectric single crystal layer to form bimorph, and thus, should be preferably prepared to have a thickness to match that of the bimorph actuator design. The base silicon layer will be defined as the post layer, therefore has a preferred thickness corresponding to the height of the post. To prepare a SOI substrate, the device silicon layer 1007 and the base silicon layer 1001 are engineered to obtain the desired thickness. Suitable thicknesses can be in the range of 0.05 µm to 100 µm for the device silicon layer 1007, and in the in range of 5 µm to 1000 µm for the base silicon layer 1001. Suitable manufacturing techniques of the SOI substrate include SIMOX (Separation by IMplantation of OXygen), Wafer-Bonding, Smart Cut, and Seed method. The SIMOX method uses an oxygen ion beam implantation process followed by high temperature annealing to create a buried $SiO_2$ layer. In the wafer bonding method, the insulating layer is formed by directly bonding oxidized silicon with a second silicon substrate. The majority of the second substrate is then subsequently removed, and the remnants forming the topmost Si layer. One prominent example of a wafer bonding process is the Smart Cut method developed by the French firm Soitec which uses ion implantation followed by controlled exfoliation to determine the thickness of the uppermost silicon layer. NanoCleave is a technology developed by Silicon Genesis Corporation that separates the silicon via stress at the interface of silicon and silicon-germanium alloy. ELTRAN is a technology developed by Canon which is based on porous silicon and water cut. In the Seed method, the topmost Si layer is grown directly on the insulator.

Figure 15B:
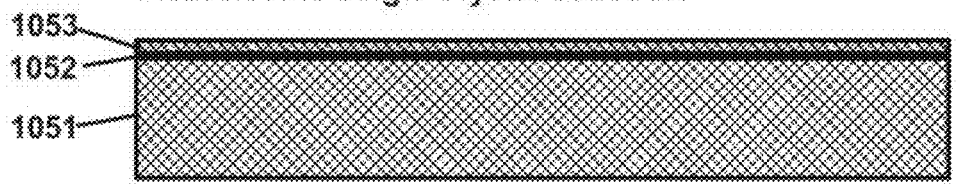
FIG. 15B is the cross-sectional view of a relaxor ferroelectric c single crystal substrate with electrode coating(s) and adhesive layer.

The procedure 1000 continues at step 1050 as shown in FIG. 15B for preparing a relaxor ferroelectric single crystal substrate (e.g. PMN-PT, PMN-PZT, or PZN-PT substrate, etc.) 1051. The substrate 1051 is first deposited with a conductor layer 1052. Suitable conductor materials include, without limitation, Al, Cu, Ag, Au, Pt, Ni, Cr, Mo, W, Ti, Ta, Nd, Nb and alloys or combinations thereof. Some typical alloys used in the art include TiW, MoW, MoCr, AlNd, AlTa, and AlCr. Bilayer metals are also useful for application as the conductive layer 1052. Some bilayer metals that are useful include Au on Ti, Au on Cr, Ag on Ti, Ag on Cr, Cr on Al, Ta on Al, Ta on Ag, Ti on Al, or Mo on Al. Trilayer metal configurations are also known in the art, including Cr/Al/Cr or Cr/Al/Ti or Ti/Al/Ti, Cr/Al/Ta, or Cr/Ag/Ta. These metals or combinations of metals can be applied by DC or RF sputtering, evaporation, or in some cases by chemical vapor deposition. Suitable thicknesses can be in the range of 0.05 to 30.0 microns, depending on the thickness of the relaxor ferroelectric crystal layer. For the conductor layer 1052, which can serve as a contact or electrode layer, other conductive materials are applicable such as indium-tin-oxide (ITO), polysilicon, silicon nitride, indium zinc oxide (IZO), Al-doped tin oxide, fluorine-doped tin oxide, silver alloys and/or gold alloys.

After the conductor layer deposition, an adhesive layer 1053 is applied onto the conductor-coated side. Suitable adhesive materials include, without limitations, BCB, SU8, PI, silicone, PBO, epoxies, UV adhesive, and other polymer adhesives. These polymer adhesives may be grounded into two categories: (1) thermosetting polymers and (2) thermoplastic polymers. Suitable thermosetting polymers for the layer 1053 include, without limitations, BCB (Dow Chemical), SU8 (Microresist), Ultra-310 (Shipley). Suitable thermoplastic polymers include Polymethyl Methacrylate (PMMA) and Liquid Crystal Polymers, etc.

Figure 15C:
FIG. 15C is the cross-sectional view of a bonded composite substrate comprising a SOI substrate in mating with a relaxor ferroelectric single crystal substrate.

The procedure 1000 continues at step 1060 for bonding the SOI substrate with the piezoelectric single crystal substrate, as shown in FIG. 15C. In a preferred embodiment, the bonding step 1060 is achieved by using adhesive layer 1053 as the bonding interface. A wafer bonder can be used to assist the bonding process with precise wafer level alignment. During the bonding process, thermal control, atmospheric control, and compressive force control, or combinations thereof, can be utilized to ensure a strong and uniform bonding. As a result, the obtained PMN-PT/SOI composite substrate is illustrated in FIG. 15C.

Alternatively, the adhesive layer can be applied onto the SOI substrate instead of the relaxor ferroelectric single crystal substrate.

Alternatively, the conductor layer 1052 on the relaxor ferroelectric single substrate 1051 can be firstly photolithographically patterned before being bonded with the SOI substrate. Alternatively, the device silicon layer 1007 of the SOI substrate can also be firstly photolithographically patterned before being bonded with the relaxor ferroelectric single crystal substrate.

Figure 15D:
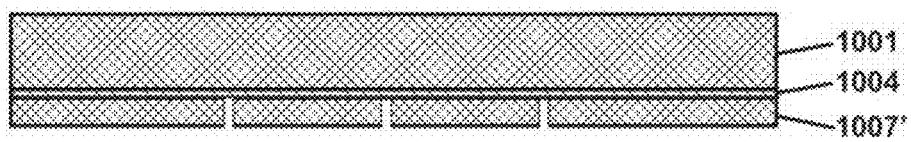
FIG. 15D is the cross-sectional views of a SOI substrate having a patterned device silicon layer 1007', and the bonded PMN-PT/SOI composite substrate comprising the SOI substrate in mating with a relaxor ferroelectric single crystal substrate.
Figure 15D:

Alternatively, both the conductor layer 1052 and the device silicon layer 1007 can be photolithographically patterned before bonding of the two substrates. In all these circumstances, the adhesive layer can be applied onto either one of or both of the substrates in order to enable sufficient bonding strength. For example, FIG. 15D illustrates the case in which the device silicon layer is a pre-patterned layer 1007' before being bonded with a relaxor ferroelectric single crystal substrate, wherein the latter has an adhesive layer 1053 pre-coated on the non-patterned conductor layer 1052.

Alternatively, instead of using an adhesive layer 1053 as the bonding interface, the composite PMN-PT/SOI substrate can also be prepared by using other bonding techniques including, without limitations, metal diffusion bonding, metal eutectic bonding technique. Metal diffusion bonds include Cu—Cu, Al—Al, Au—Au and others metallurgies that enable better hermeticity than traditional glass frit and anodic bonds. In addition, the use of metal diffusion bonds allows the mechanical and electrical connections to be made between two wafers in one step. Metal eutectic bonding of wafers can also be utilized, and a unique feature of which is that the melting of the solder-like alloys is capable of facilitating surface planarization and provides a tolerance of surface topography and particles.

Figure 15E:
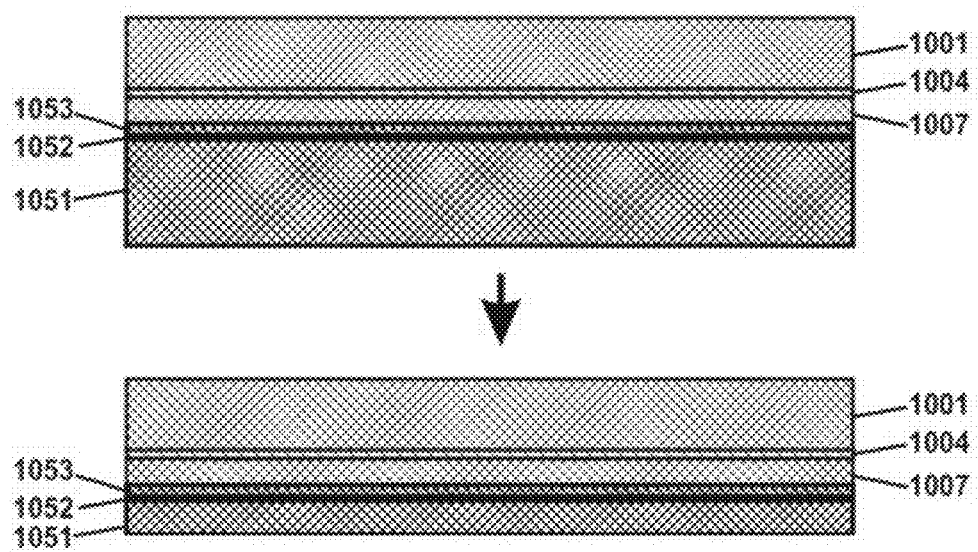
FIG. 15E is cross-sectional views of a PMN-PT/SOI composite substrate before and after the PMN layer thickness is reduced, respectively.

The procedure 1000 continues at step 1075 for processing on the bonded PMN-PT/SOI composite substrate. First, if necessary, the thickness of the piezoelectric single crystal layer (e.g. PMN-PT or PMN-PZT crystal) 1051 is reduced to a desired thickness determined by the cantilever actuator design, as shown in FIG. 15E. Suitable thickness of the layer 1051 after the thickness reduction process is in the range of 0.05 to 200 microns. Suitable methods that can be used to reduce the crystal material thickness includes, without limitations, grinding, lapping, polishing, chemical mechanical polishing (CMP), chemical wet etching, plasma dry etching, or combinations thereof. After the thickness reduction, as shown in FIG. 15E, the material layer 1051 has a design thickness suitable for optimized operation of the cantilever bimorph actuators.

Figure 15F:
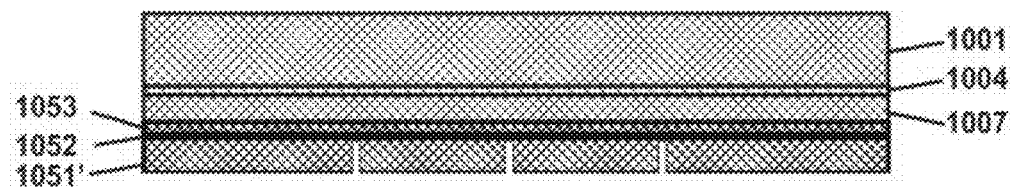
FIG. 15F is a cross-sectional view of the composite substrate after the bimorph layer layout has been formed in its relaxor ferroelectric single crystal layer.

Referring now to FIG. 15F, a cross-sectional view of the composite substrate after the bimorph layer layout has been formed in its relaxor ferroelectric single crystal layer, the layer 1051 in FIG. 15E is herein re-numbered as the layer 1051', designating that the layer has been patterned by using a photolithograph process followed by etching. Typical photoresists are applied as known in the art, then UV-exposed through photomask patterns, and finally developed into an etching mask.

Alternatively, a metal layer can be electroplated onto the substrate, following the conjugated patterns of the photoresist layer, serving as a mask for deep reactive ion etching (RIE) of the relaxor ferroelectric single crystal layer.

Alternatively, the relaxor ferroelectric single crystal layer is mechanically patterned by dicing technique.

Alternatively, the relaxor ferroelectric single crystal layer is patterned by using laser cutting technique.

Alternatively, the relaxor ferroelectric single crystal layer is patterned by ion milling and/or direct ion-beam writing techniques.

Alternatively, the relaxor ferroelectric single crystal layer is patterned by using combinations of the above techniques thereof.

Referring now to FIG. 15G-I, the cross-sectional views of the PMN-PT/SOI composite substrate after being patterned for its conductor layer 1052, adhesive layer 1053, and the device silicon layer 1007 plus box layer 1004, respectively. By using the etched relaxor ferroelectric single crystal layer 1051' as a etching mask, the conductor layer 1052 is further etched with the same pattern, forming a patterned conductor layer 1052', and after which, the adhesive layer 1053 is further etched to become the patterned adhesive layer 1053', exposing the device silicon layer that is further etched to form layer 1007', and finally the expose box oxide layer 1004 is etched to become the patterned layer 1004'. Suitable etching methods include chemical wet etching, plasma dry etching, laser cutting, ion milling, and combinations thereof. Depending on the layer materials, different etching recipes known in the art are utilized.

Figure 15J:
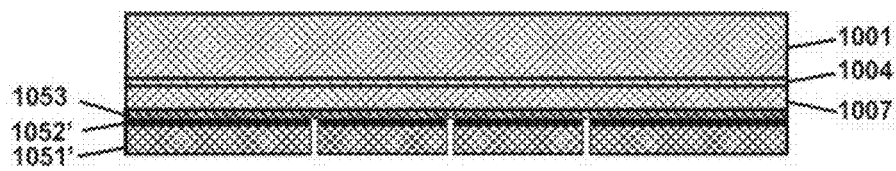
FIG. 15J is the cross-sectional view of the PMN-PT/SOI composite substrate after film deposition and etching of a metal layer 1016 on the SOI base silicon side.
Figure 15J:
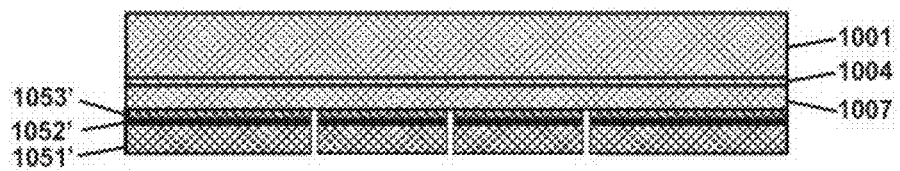
Figure 15J:
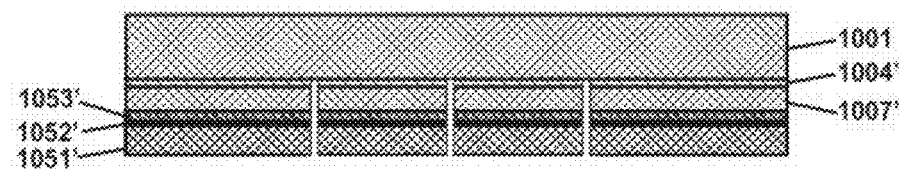
Figure 15J:
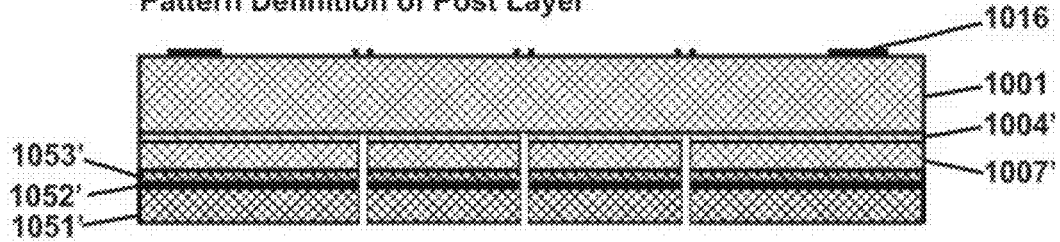

Referring now to FIG. 15J, a cross-sectional view of the PMN-PT/SOI composite substrate after film deposition and etching of a metal layer 1016, a metal layer 1016 is deposited onto the base silicon, followed by a photolithograph process, then etched to produce patterns for the post structures (e.g. the post 105 in FIG. 3, or the post 905 in FIG. 9). In carrying out the photolithographic process, double side alignment capability may be used in order to align precisely to the existing bimorph patterns on the other side of the composite substrate. Such patterned metal layer 1016 serves as a mask as well for future deep reactive etching process in defining the post layer. The post layer also has solid features surrounding the mirror chip edges for supporting a deformable mirror membrane at the chip edges.

Figure 15K:
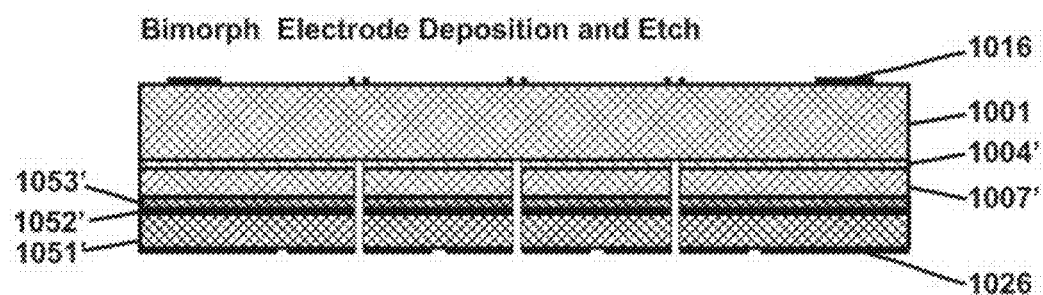
FIG. 15K is a cross-sectional view of the PMN-PT/SOI composite substrate after deposition of the bimorph electrode layer 1026.

Referring now to FIG. 15K, a cross-sectional view of the PMN-PT/SOI composite substrate after deposition of the bimorph electrode layer, a conductor layer 1026 is deposited to the PMN-PT single crystal layer 1051' and the electrode patterns are then defined with a standard photolithograph step, followed by a liftoff process to generate addressable electrodes for bimorph actuator assemblies.

Figure 16:
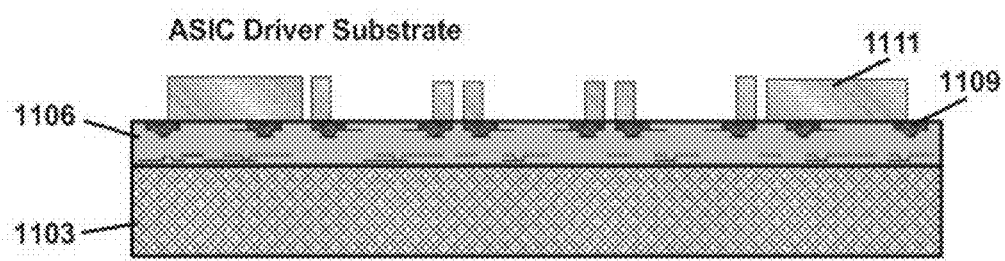
FIG. 16 is a cross-sectional view of a prepared ASIC driver substrate having a patterned indium layer.

Referring now to FIG. 16, the procedure 1000 continues at step 1100 for preparing a base substrate that is to be bonded with the PMN-PT/SOI composite substrate. Apparently, preparing the base substrate is an independent step that can be carried out in advance of the steps of preparing the PMN-PT/SOI composite substrate. In one preferred embodiment, the base substrate is an ASIC driver substrate 1103. To prepare the die substrate 1103 for the hybrid integration and at the same time avoid a high-risk planarization process, a thicker indium layer is being used as a bonding interface for establishing wafer bonding. As shown in FIG. 16, a liftoff process is applied onto the ASIC substrate to produce indium bonding pad layer 1111. Herein, the indium layer 1111 is required to have a higher thickness in order to (1) abundantly overstep the heights of the surface topology on the VLSI wafer and (2) provide the free-space gap to allow the actuator motion. In most application cases, the suitable thicknesses of the indium are in the range of 1-200 microns. The indium layer serves also as intermediate metal connection to connect electrodes 1109 on the ASIC substrate 1103 to the bimorph electrode layer 1026, as a bonding interface in between the ASIC substrate 1103 and the PMN-PT/SOI composite substrate (see FIG. 15H), and finally as a spacer supporting for the neighborhood PMN-PT geometries where suspending for actuators is not required. As both the bottom (for applying actuation voltage) and the top (for ground connection) electrodes of the PMN-PT bimorph cantilever assemblies require electrical connections, it is not practical to establish ground connection individually for each local pixel in the actuator array. Thus, in the preferred embodiment, the neighborhood features in the PMN-PT layer serves the important function of connecting all local pixel grounds to an external global ground at the chip edge.

Figure 17:
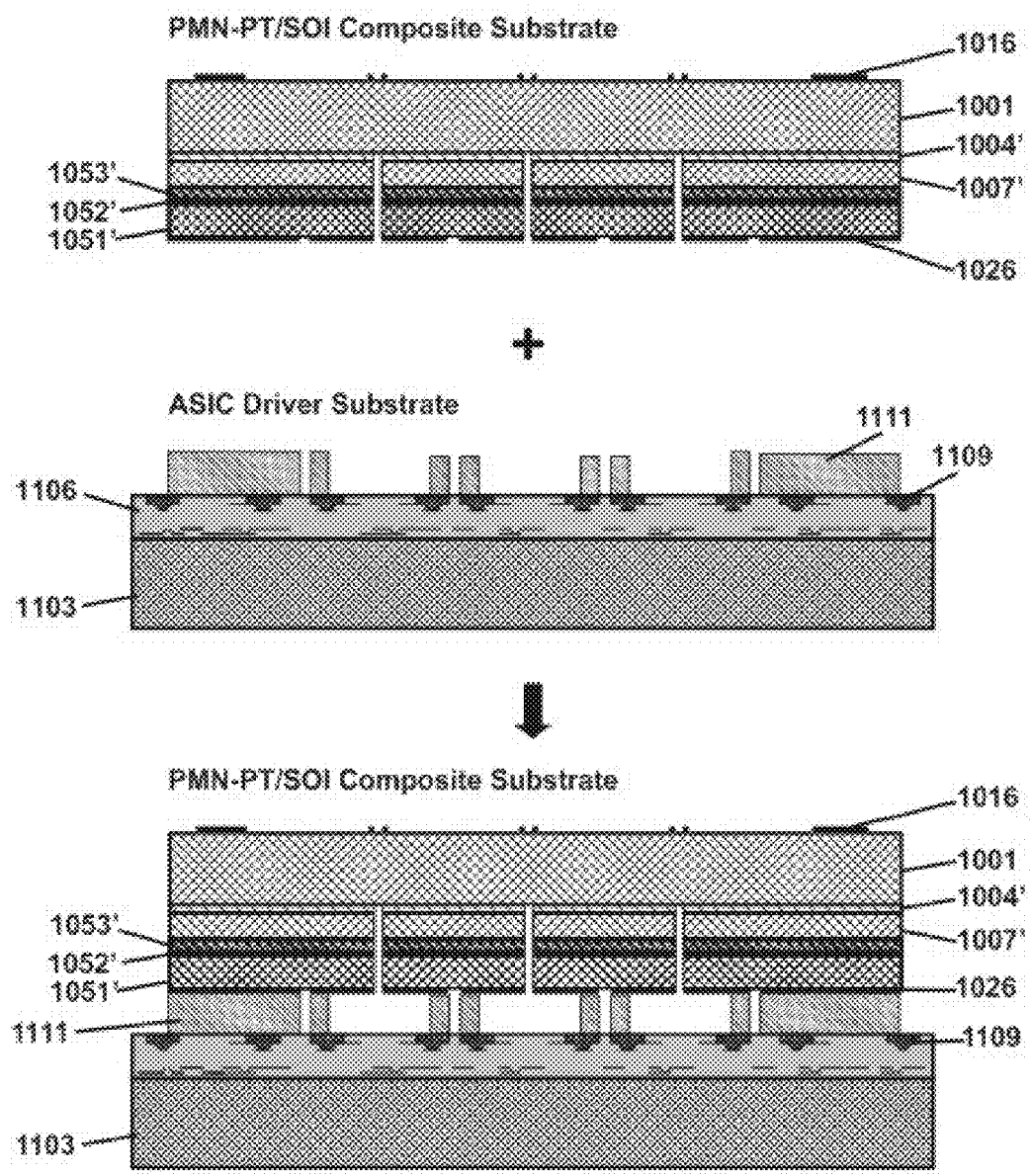
FIG. 17 is a cross-sectional view of hybrid bonding process for mating the PMN-PT/SOI composite substrate with an ASIC driver substrate by using a thick indium layer as bonding interface in accordance with a preferred embodiment of the present invention.

The procedure 1000 continues at step 1110 for bonding the ASIC substrate to the PMN-PT/SOI composite substrate, as shown in FIG. 17. The indium layer 1111 is thermally compressed to enable bonding with PMN-PT's electrodes. In mating with PMN-PT wafer, a temperature as low as 45~200° C. can be used to melt (or reflow) the indium layer, safe for both CMOS circuitry and the material patterns pre-defined on the PMN-PT/SOI composite substrate.

Alternatively, instead of using an indium layer 1111 as the bonding interface, the composite PMN-PT/SOI substrate can also be bonded with the ASIC substrate by using other bonding technologies including, without limitations, metal diffusion bonding method, metal eutectic bonding method, and method using a conductive polymer material. Metal diffusion bonds include Cu—Cu, Al—Al, Au—Au and others metallurgies that enable better hermeticity than traditional glass frit and anodic bonds. On the other hand, a unique feature of metal eutectic bonding is the melting of the solder-like alloys that facilitate surface planarization and provides a tolerance of surface topography and particles.

Figure 18:
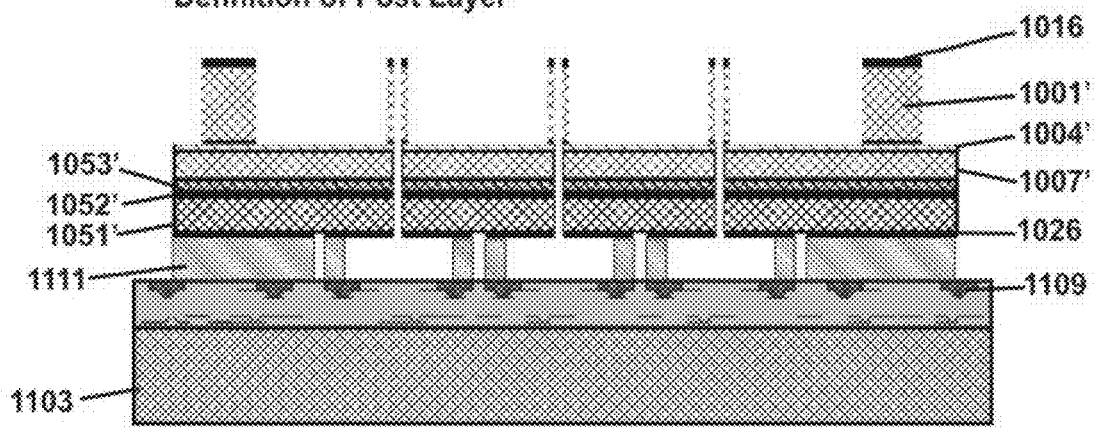
FIG. 18 is a cross-sectional view of the stacked SOI/PMN-PT/ASIC substrate after the post layer is patterned through a DRIE process.

The procedure 1000 continues at step 1125 for processing on the stacked SOI/PMN-PT/ASIC composite substrate. A DRIE process is utilized to etch through the base silicon to generate the linkage post layer 1001', as shown FIG. 18. The pre-defined patterns on the SOI base silicon serves as a registration reference for the DRIE photolithograph. Once the box oxide is exposed, an additional HF vapor etch is optional in order to remove the exposed oxide.

The procedure 1000 continues at step 1150 for preparing a deformable mirror membrane. Suitable mirror materials include, without limitations, silicon, polysilicon, silicon nitride, silicon carbide, nitrocellulose, CP1, polyimides, tensioned plastic membrane, and many other polymer materials. In a preferred embodiment, single crystal silicon deformable mirror is used in order to enable a highly reliable material system. In addition, the deformable membrane is usually coated with a metal layer or a stack of optical reflective material(s) (e.g. Au, Ag, Al, alloy, and stack of dielectric coatings, etc.) in order to enhance the reflectivity of the deformable mirror. These reflective coating(s) can be applied either before or after the deformable membrane is disposed onto the post structures. In one preferred embodiment, the deformable membrane is prepared as freestanding membrane. In another preferred embodiment, the deformable membrane is provided in attachment with a carrier substrate. In yet another preferred embodiment, the deformable membrane is an inherit layer on a substrate, for examples, a device silicon layer of a SOI substrate, a deposited film on a silicon substrate, etc. Depending on the types of the deformable membrane, different methods known in the art can be selected to enable disposition of the membrane onto the post structures 1001' (see FIG. 18).

Figure 19:
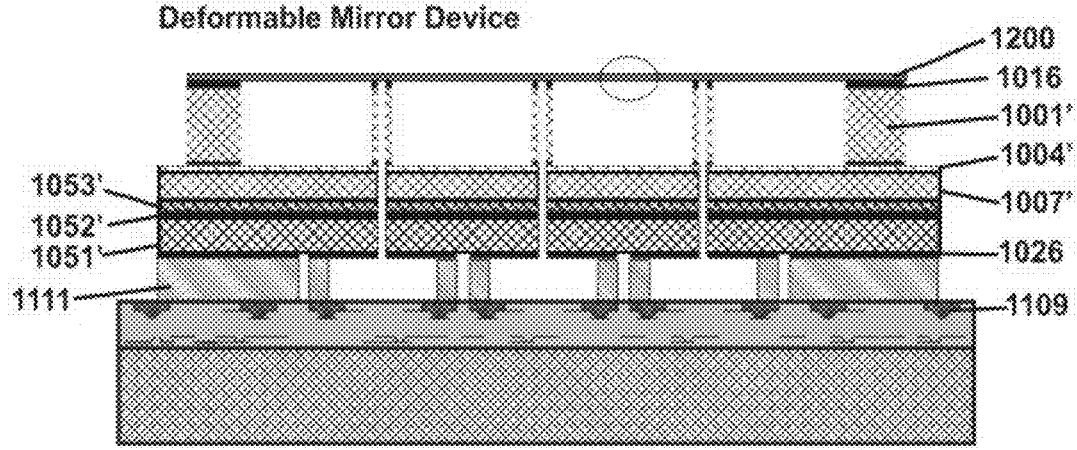
FIG. 19 is a cross-sectional view of an exemplary deformable mirror device constructed by using a preferred single crystal material system and accomplished by using a preferred manufacturing procedure in accordance with the present invention.
Figure 19A:
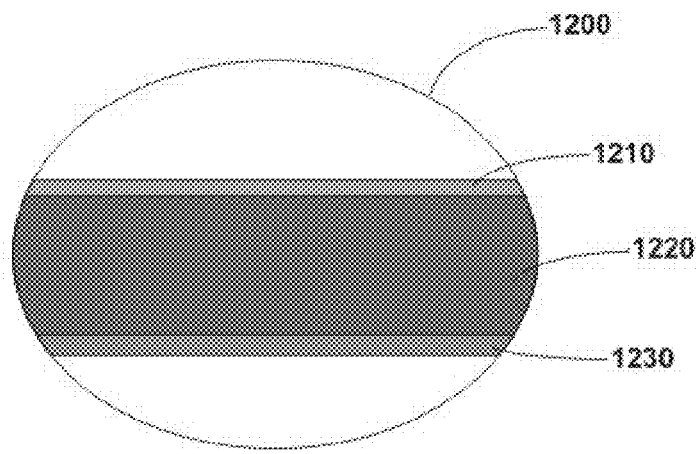
FIG. 19A is an amplified and partial cross-sectional view for a portion of the deformable mirror 1200 of FIG. 19 comprising the deformable membrane 1220 with its reflective coating 1210 and adhesive coating 1230 on its both sides, respectively.

As an example, the procedure 1000 concludes at step 1175 for bonding a freestanding single crystal silicon membrane onto the post structures 1001'. The silicon membrane usually has a thickness less than 50 microns and is pre-coated with a thermosetting or thermoplastic polymer material (e.g. BCB, SU8, Ultra-I 310, PMMA, etc.). The membrane is brought in contact with the post layer 1001', a thermal-conductive flat substrate can be optionally used as a mechanical support for applying a compressive force to the membrane, and by concurrently raising the temperature of the bonding assembly to a suitable level, the bonding of the deformable membrane 1200 to the post layer 1001' is established, as shown in FIG. 19. An amplified cross-sectional view for a portion of the deformable mirror 1200 is shown in FIG. 19A, comprising the deformable membrane 1220 with its reflective coating 1210 and adhesive coating 1230 on its both sides, respectively.

Figure 20:
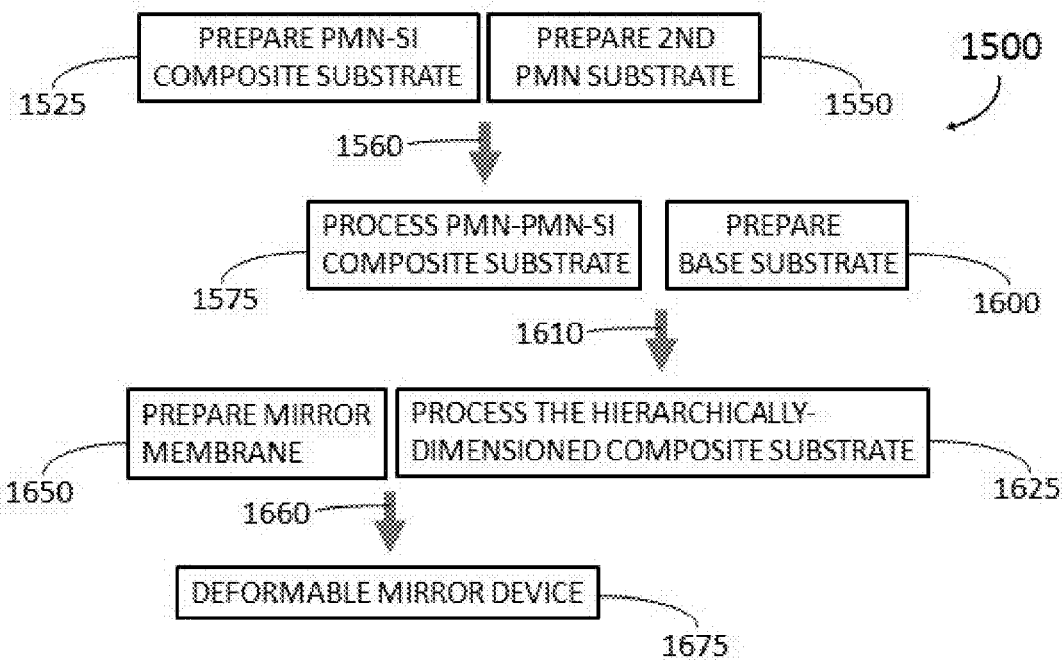
FIG. 20 is another example of a manufacturing process for construction of a MEMS hierarchically-dimensioned continuous-face-sheet deformable mirror device in accordance with the present invention.

It should be appreciated that procedure 1000 illustrates one sequence of processes appropriate to the formation of a deformable mirror device, but many other process sequences are possible. In some cases the ordering of the steps can be altered. In some cases, the material system can be modified. FIG. 20, for instance, illustrate a sequence of processes appropriate to the formation another preferred embodiment of deformable mirror device by using dual PMN-PT layers in forming the piezoelectric bimorph cantilever assemblies.

Figure 20A:
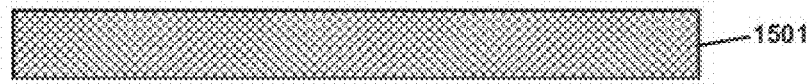
FIG. 20A-C is the set of cross-sectional views of the process sequence 1500 for manufacturing another preferred deformable mirror embodiment that is actuated by dual-PMN-PT-layer cantilever assemblies.
Figure 20A:
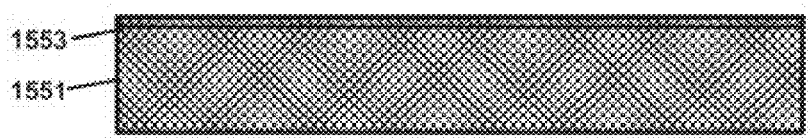
Figure 20A:
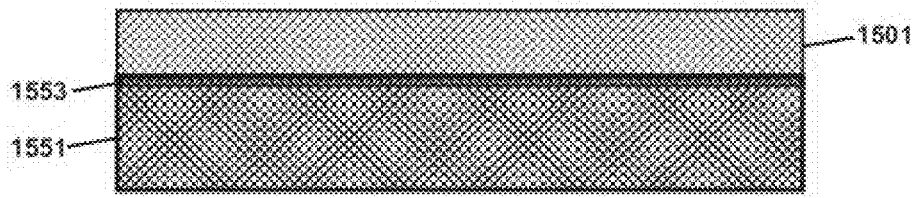
Figure 20A:
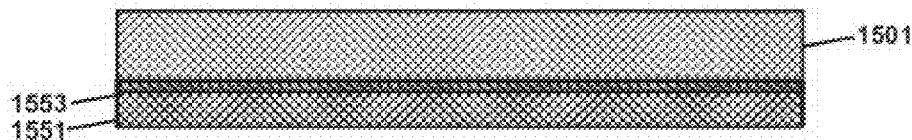
Figure 20B:
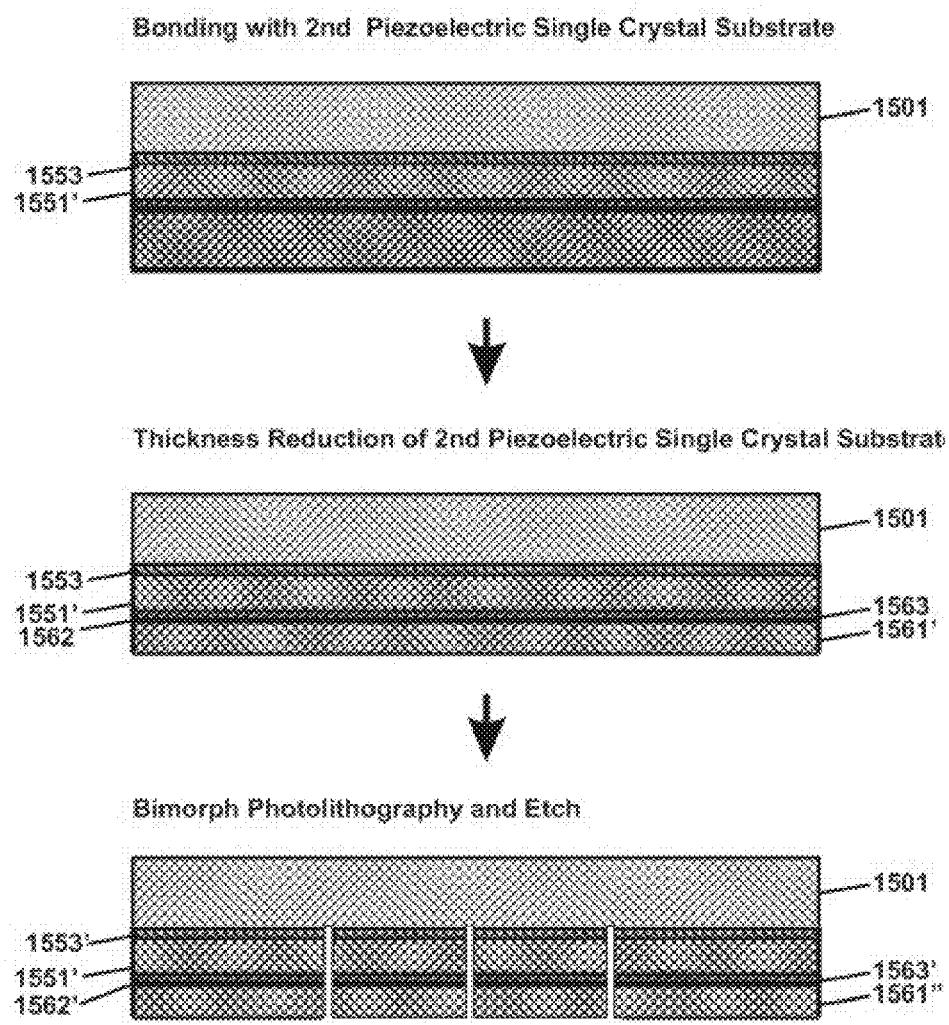
Figure 20C:
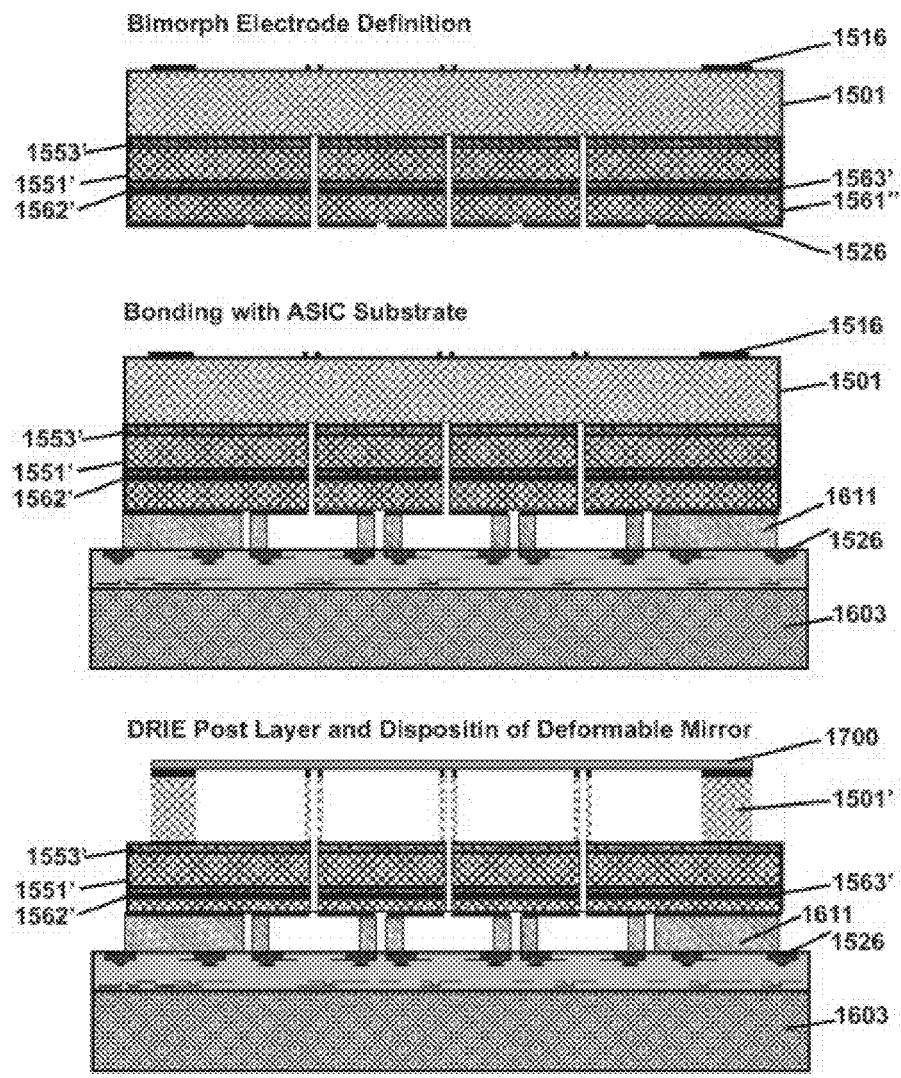

FIG. 20A-C illustrates the manufacturing process or procedure 1500 for construction of a MEMS hierarchically-dimensioned continuous-face-sheet deformable mirror device and the associated dual-PMN-PT-layer cantilever assembly. The procedure 1500 includes a step 1525 for preparing a PMNPT/Si composite substrate, a step 1550 for preparing a $2^{nd}$ relaxor ferroelectric single crystal substrate, and a step 1560 for bonding the PMN-PT/Si composite substrate with the $2^{nd}$ relaxor ferroelectric single crystal substrate. The procedure 1500 also includes a step 1575 to continue processing on the bonded PMN-PT/PMN-PT/Si composite substrate that is obtained in step 1560. The procedure 1500 also includes a step 1600 for preparing a base substrate, which will be bonded with the aforementioned composite substrate through a step 1610, producing a hierarchically-dimensioned composite substrate. The procedure 1500 also includes a step 1625 to continue processing on the hierarchically-dimensioned composite substrate, a step 1650 to prepare a mirror membrane, and a step 1660 for applying the mirror membrane onto the hierarchically-dimensioned substrate, thus ultimately producing the deformable mirror device through the step 1625.

FIG. 20A-C is the set of cross-sectional views of the process sequence 1500 for manufacturing another preferred deformable mirror embodiment that is actuated by dual-PMN-PT-layer cantilever assemblies.

In this manufacturing path, the method is to build the MEMS driven, hierarchically-dimensioned deformable mirror device by sandwiching the dual-PMN-PT bimorphs in between a silicon wafer (as the Post) and the ASIC driver substrate.

Using a thick silicon layer 1501 as a polishing carrier, the PMN-PT layer is lapped, polished, patterned and after which, an additional photolithograph step with metal etching is adopted to segment the metal layer to obtain individually addressable electrodes on the silicon layer 1501, as shown in FIG. 20A.

The complexities of this manufacturing design, in comparison with the PMN-PT/SOI approach, lie in that one additional ultrathin PMN-PT crystal 1061' is in use and a PMN-PMN bonding step, as shown in FIG. 20B, is added.

The completed composite wafer comprises of the thick silicon layer in bonding with the dual PMN-PT bimorph layers, having a pre-defined metal layer on the silicon including patterns and alignment features for precise registration with both the Post mask and the driver substrate. Using the same technique as described in the Procedure 1000, the composite architecture is then bonded with a ASIC driver substrate 1603, and upon completion, a Si DRIE process will be applied to form the posts and deformable membrane 1700 be disposed atop of the post array 1501', that concludes the manufacturing of the hierarchy-dimensioned deformable mirror structure, as shown in FIG. 20C.

Figure 21:
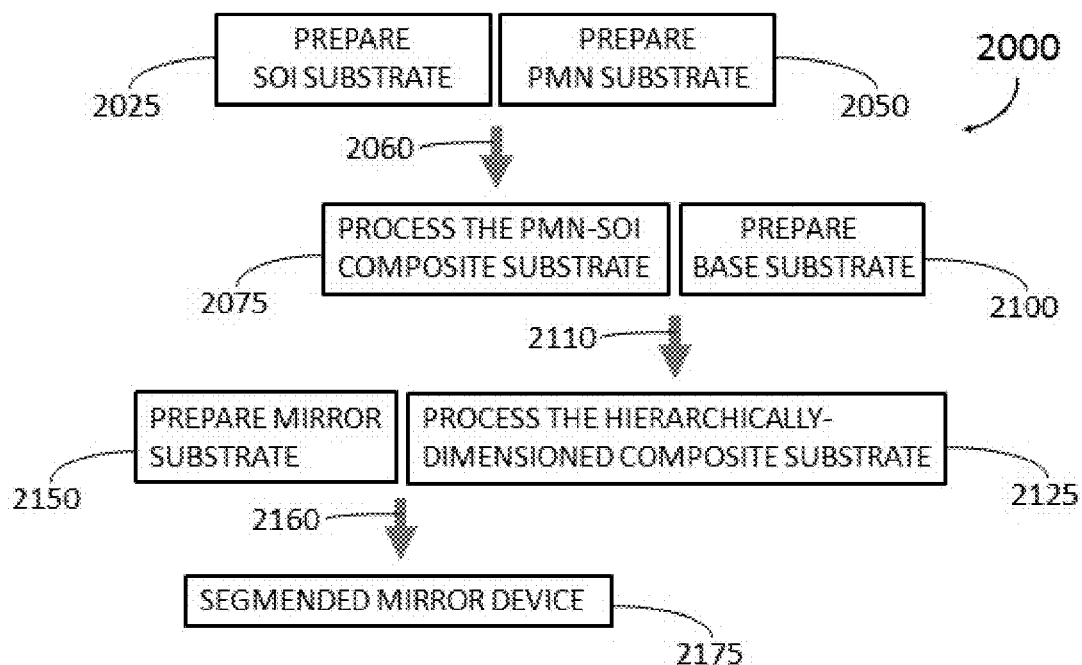
FIG. 21 is one example of a manufacturing process for construction of a MEMS hierarchically-dimensioned continuous-face-sheet deformable mirror device in accordance with the present invention.

In addition to the aforementioned embodiments for building the continuous-face-sheet deformable mirrors, the present invention also describes another new and useful mirror design for practicing high-performance segmented mirror devices, as shown in FIG. 9. Referring now to FIG. 21, FIG. 21 illustrates one example of a manufacturing process or procedure 2000 for construction of a MEMS hierarchically-dimensioned segmented mirror device with its associated single crystal cantilever assembly.

Figure 22A:
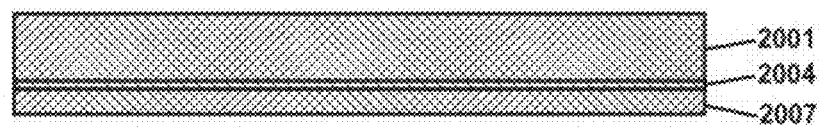
FIG. 22A is a cross-sectional view of the substrates being prepared by using the Step 2025, Step 2050, and Step 2060, respectively.
Figure 22A:
Figure 22A:
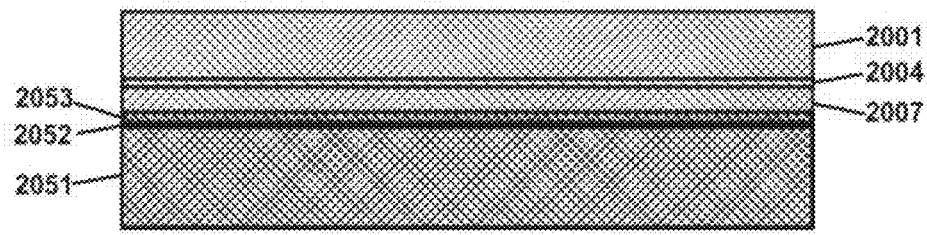

Similar to the procedure 1000, the procedure 2000 includes a step 2025 for preparing a SOI (Silicon-On-Insulator) substrate, a step 2050 for preparing a relaxor ferroelectric single crystal substrate, and a step 2060 for bonding the SOI substrate with the relaxor ferroelectric single crystal substrate. As shown in FIG. 22A, the SOI substrate in the Step 2025 is prepared to have desirable thicknesses for its base silicon layer 2001, its box oxide layer 2004, and its device silicon layer 2007. Suitable thickness of the base silicon layer 2001 is in the range of 5 to 500 microns. Suitable thickness of the box oxide layer 2005 is in the range of 0.1 to 5 microns, and suitable thickness of the device silicon layer 2007 is in the range of 0.1 to 300 microns. As shown in FIG. 22A, the relaxor ferroelectric single crystal substrate prepared through the Step 2050 comprises the relaxor ferroelectric single crystal layer 2051 coated with an electrical conductor layer 2052, and is further coated with an adhesive layer 2053. The suitable materials of the relax ferroelectric single crystal layer 2051 includes, without limitations, PMN-PT, PZN-PT, PLZT, PMN-PZT, and other relaxor ferroelectric single crystal materials. Suitable thickness of the relaxor ferroelectric single crystal layer 2051 is usually less than 1000 microns. As shown in FIG. 22A, the SOI substrate and the piezoelectric single crystal substrate are then bonded together by using the adhesive layer 2053 as the bonding interface. Other bonding techniques known in the art that can be used to practice the substrate bonding includes, without limitations, metal eutectic bonding, metal diffusion bonding, etc.

Figure 22B:
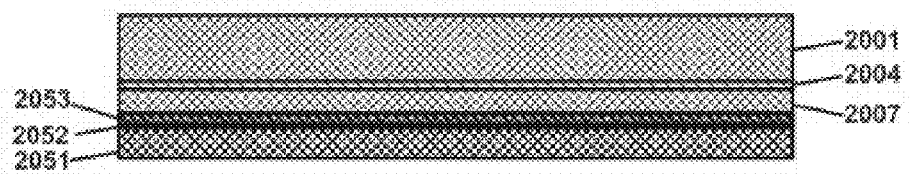
FIG. 22B is cross-sectional view of the PMN-PT/SOI composite substrates going through processing nodes 2075A-D, respectively.
Figure 22B:
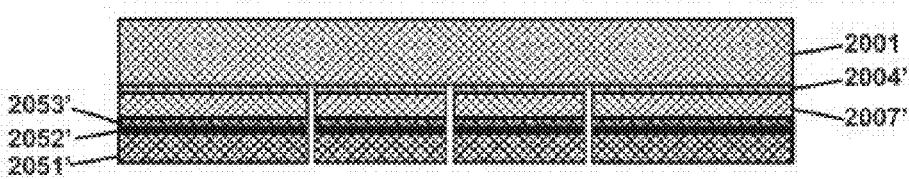
Figure 22B:
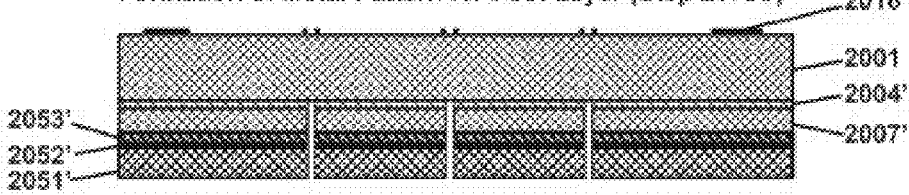
Figure 22B:
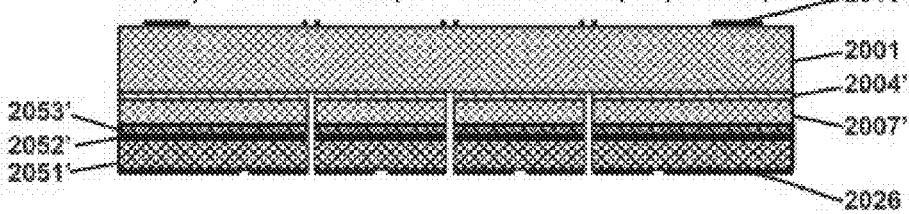

Similar to the procedure 1000, the procedure 2000 also includes a step 2075 to continue process on the bonded composite substrate that has been obtained at step 2060. The step 2075 is divided into four processing nodes 2075A-D. At the processing node 2075A, the PMN-PT/SOI composite substrate goes through a thickness reduction process aiming to reduce the thickness of the PMN-PT crystal to a desirable level, as shown in FIG. 22B. Suitable methods that can be used to reduce the crystal thickness include, without limitation, grinding, lapping, polishing, chemical mechanical polishing (CMP), wet etching, ion milling, and reactive ion etching (RIE), and combinations thereof. The targeted thickness of the PMN-PT crystal after reduction is in the range of 0.1 to 250 microns. At the processing node 2075B, the composite substrate is sequentially etched through its PMN-PT layer 2051, conductor layer 2052, adhesive layer 2053, device silicon layer 2007, and the box oxide layer 2004, respectively. The etched layers has geometric patterns of the bimorph cantilever structures, and are herein re-numbered as 2051', 2052', 2053', 2007', and 2004', respectively. The step 2075 is then followed by a processing node 2075C, through which a metal layer 2016 is deposited onto the base silicon layer 2001 and etched to form geometric patterns for the post layer.

The step 2075 concludes at the processing node 2075D, through which a patterned metal layer 2026 is formed onto the PMN-PT crystal layer as the individually-addressable electrodes for the bimorph cantilever actuator assemblies.

Similar to procedure 1000, the procedure 2000 also includes a step 2100 for preparing a base substrate, which will be bonded with the aforementioned composite substrate through a step 2110, producing a hierarchically-dimensioned composite substrate.

Figure 22C:
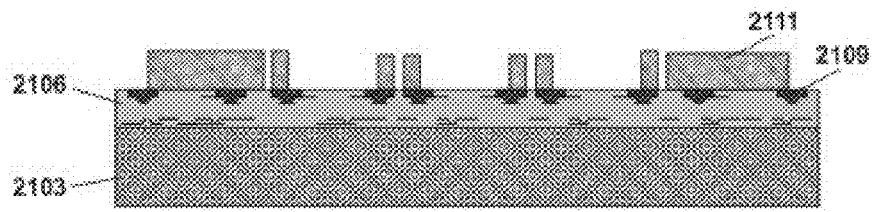
FIG. 22C is a cross-sectional view of the MEMS hierarchically-dimensioned structure being processed sequentially by using the step 2100, step 2110, and step 2125, respectively.
Figure 22C:
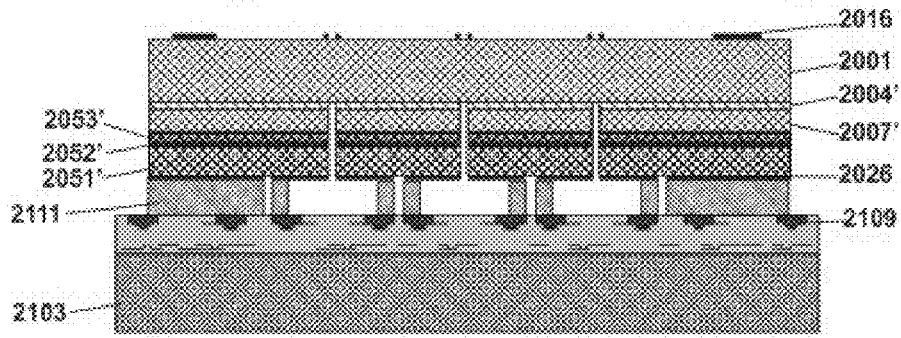
Figure 22C:
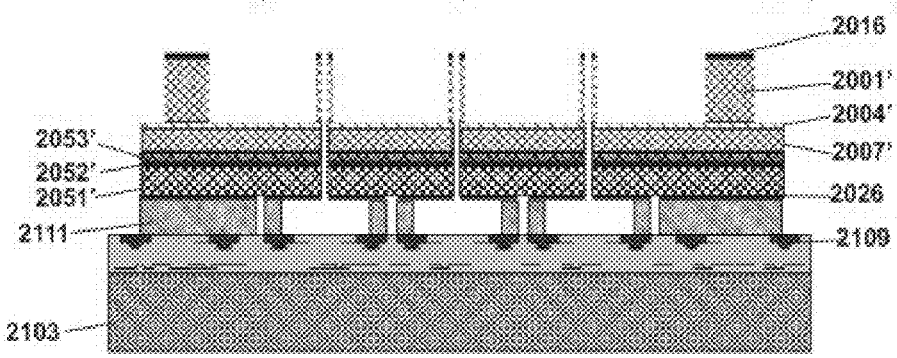

Similar to the procedure 1000, the procedure 2000 also includes a step 2125 to continue processing on the hierarchically-dimensioned composite substrate. As shown in FIG. 22C, the step 2100 prepares a base substrate with bonding interface layer 2111. In a preferred embodiment, the base substrate is an ASIC driver substrate. In another preferred embodiment, the base substrate is a substrate having patterned electrodes with wiring pads. In the case of using an ASIC driver substrate 2103, the electrodes and wiring may be patterned by semiconductor processing known to the art, and the electrode layer 2109 could be Metal 1, Metal 2, Metal 3, Metal 4, or Metal 5, etc. depending on the semiconductor circuit fabrication technology and thin film stack 2106 in use. In the preferred embodiment, as shown in FIG. 22C, the ASIC driver substrate is deposited and patterned with an indium layer 2111, in contact with the metal layer on the ASIC substrate, having a substantially thick layer thickness to allow the motion of the cantilever actuators. As shown in FIG. 22C, the step 2110 bonds the PMN-PT/SOI composite substrate to the ASIC driver substrate by using the indium layer 2111 as the bonding interface. Other bonding techniques known to the art such as metal eutectic bonding and metal diffusion bonding can be alternatives to serve the same purpose. The bonded hierarchically-dimensioned substrate then receives a deep reactive etching process at the step 2125 by using the pre-defined metal layer 2016 as a etch stop.

Figure 22D:
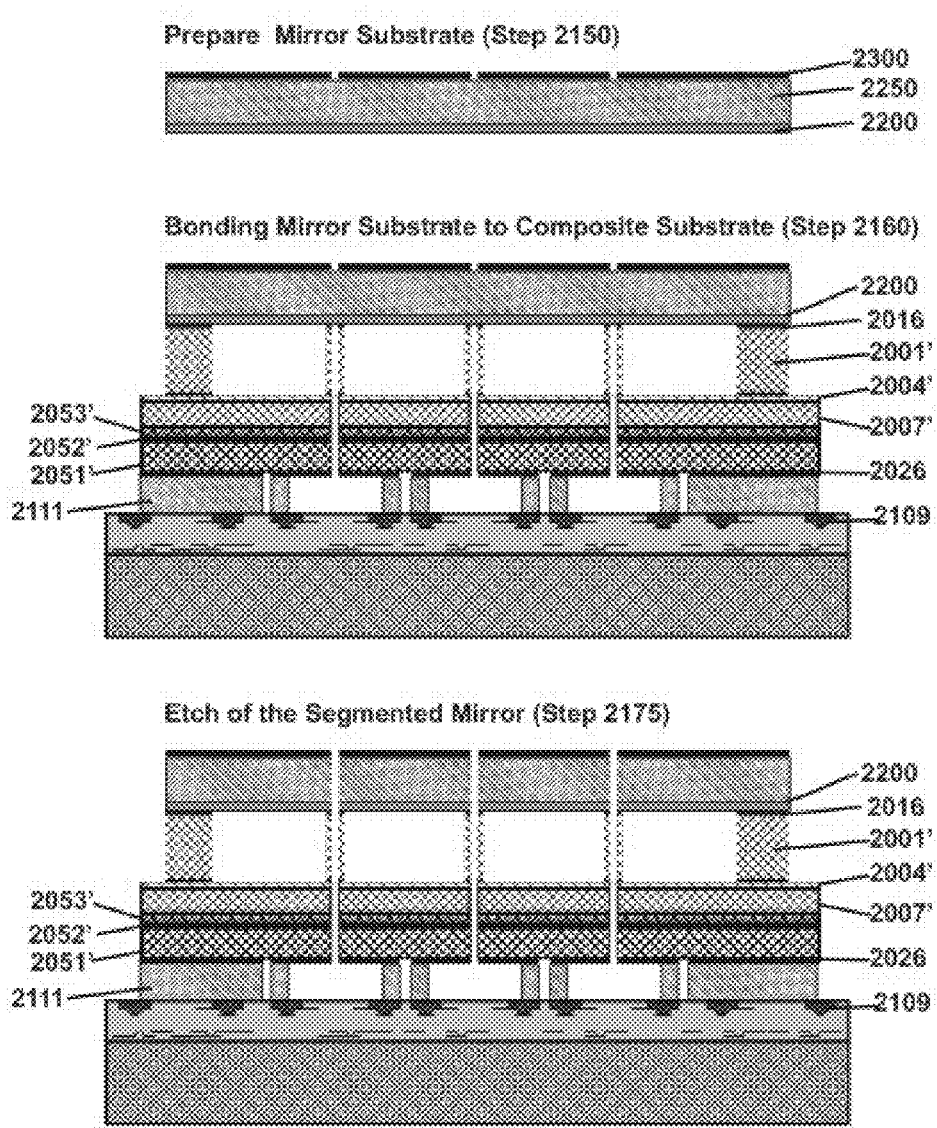
FIG. 22D is the cross-sectional view of the MEMS hierarchically-dimensioned structure being processed sequentially by using the step 2150, step 2160, and step 2175, respectively.

However, different from procedure 1000, the procedure 2000 includes a step 2150 to prepare a rigid mirror substrate instead of a deformable membrane, as shown in FIG. 22D. The procedure 2000 also includes a step 2160 for applying the rigid mirror onto the hierarchically-dimensioned substrate, and also different from procedure 1000, such bonded rigid mirror will be patterned ultimately produce the segmented mirror device through a step 2125, as shown in FIG. 22D. Suitable patterning methods include chemical wet etching, plasma dry etching, ion milling, laser cutting, and combinations thereof.

The step 2150 in the FIG. 22D prepares an optical flat substrate 2250, for which suitable materials include, without limitations, silicon, glass, sapphire, polysilicon, SiC, etc. Suitable thickness of the substrate is in the range of 3-300 microns depending on the segmented mirror pixel size and the requirements on mirror rigidity. The substrate on its top side may be coated and patterned with a metal and/or a stack of dielectrics layer 2300 in order to enhance optical reflectivity of the segmented mirror elements. The opposite side of the substrate is preferably coated with an adhesive layer 2200 to enable bondability with the hierarchically-dimensioned substrate completed at step 2125. Other bonding techniques known to the art such as metal eutectic bonding and metal diffusion bonding can be alternatives to serve the same purpose. As shown in FIG. 22D, the step 2160 bonds the substrate 2250 to the hierarchically-dimensioned substrate, and after which an etch process is followed to mechanically segment the mirror substrate 2250 into pixel array. The array distribution manner can be any geometry, however, the mirror pixel distribution manner is preferably to be line distribution, square distribution, triangular distribution, and/or hexagonal distribution.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Furthermore, any embodiments disclosed in the subject application by using relaxor ferroelectric single crystal piezoelectric or electrostrictive materials can also be produced by alternatively using other piezoelectric materials such as ceramics and/or polymer piezoelectric materials. Moreover, any embodiments disclosed in the subject application are not to be taken as the only possible embodiments.

What is claimed is:

1. A deformable mirror device comprising:
   a substrate;
   a plurality of spacer structure extending from the substrate;
   a plurality of piezoelectric cantilever actuator assembly disposed on the spacer structure, and
   a deformable mirror membrane disposed on the plurality of cantilever actuator assembly.

2. The deformable mirror device of claim 1 in which each piezoelectric cantilever actuator assembly has at least one post upstanding on and near the cantilever distal end.

3. The cantilever actuator assembly of claim 2 in which the post is mechanically attached to the mirror membrane.

4. The cantilever actuator assembly of claim 3 in which the post is substantially rigid.

5. The cantilever actuator assembly of claim 3 in which the post is resilient capable of being deformed.

6. The deformable mirror device of claim 1 in which each cantilever actuator assembly is a piezoelectric monomorph cantilever actuator.

7. The deformable mirror device of claim 1 in which each cantilever actuator assembly is a piezoelectric bimorph cantilever actuator.

8. The deformable mirror device of claim 1 in which each cantilever actuator assembly is a piezoelectric unimorph cantilever actuator.

9. The piezoelectric cantilever actuator of claim 1 includes at least one relaxor ferroelectric single crystal layer.

10. The piezoelectric cantilever actuator of claim 1 includes at least one piezoelectric layer made of materials other than the relaxor ferroelectric single crystal layer.

11. The piezoelectric cantilever actuator assembly of claim 1 uses force-enhancement method to increase the piezoelectric force of the actuator.

12. The piezoelectric cantilever actuator of claim 1 uses travel range extension method to increase the travel range of the actuator.

13. The piezoelectric cantilever actuator of claim 1 uses both the force enhancement method and the travel range extension method to improve the performance of the deformable mirror device.

14. The deformable mirror device of claim 1 in which the substrate includes at least one electrical electrode in connection with the electrodes of the cantilever actuator assemblies.

15. The deformable mirror device of claim 1 in which the substrate includes semiconductor integrated driver circuits and associating electrodes in interconnection with the electrodes in the cantilever assemblies.

16. The deformable mirror device of claim 1 in which each piezoelectric cantilever actuator assembly is periodically patterned and has adjacent joints that maintain the piezoelectric material layer as a monolithically continuous piece that extends through the entire array of the piezoelectric cantilever actuator assemblies.

17. The monolithically continuous piece of claim 16 extends through the entire array of the piezoelectric cantilever actuator assemblies, providing an interconnected web structure for metal coating to be applied on the top side, capable of leading the electrical connection to the array edge, and as a result, establishing common electrode for either part of or the entire array of the cantilever actuator assemblies.

18. A segmented mirror device comprising:
    a substrate;
    a plurality of spacer structure extending from the substrate;
    a plurality of piezoelectric cantilever actuator assembly disposed on the spacer structure, and
    a segmented, rigid mirror disposed on the plurality of cantilever actuator assembly.

19. The segmented mirror device of claim 18 in which each cantilever actuator assembly has at least one post upstanding on and near the cantilever distal end.

20. The cantilever actuator assembly of claim 19 in which the post is mechanically attached to the segmented mirror.

21. The segmented mirror of claim 18 in which the mirror is substantially rigid.

22. The cantilever actuator assembly of claim 19 in which the post is resilient capable of being deformed.

23. The deformable mirror device of claim 18 in which each cantilever actuator assembly is a piezoelectric monomorph cantilever actuator.

24. The deformable mirror device of claim 18 in which each cantilever actuator assembly is a piezoelectric bimorph cantilever actuator.

25. The piezoelectric monomorph cantilever actuator of claim 23 includes at least one electrode.

26. The piezoelectric bimorph cantilever actuator of claim 24 includes at least one electrode.

27. The piezoelectric monomorph cantilever actuator of claim 23 includes at least one relaxor ferroelectric single crystal layer.

28. The piezoelectric bimorph cantilever actuator of claim 24 includes at least one relaxor ferroelectric single crystal layer.

29. The piezoelectric monomorph cantilever actuator of claim 27 uses the force enhancement method to improve piezoelectric force of the actuator.

30. The piezoelectric bimorph cantilever actuator of claim 28 uses the force enhancement method to improve piezoelectric force of the actuator.

31. The piezoelectric monomorph cantilever actuator of claim 27 uses the travel range extension method to improve the travel range of the actuator.

32. The piezoelectric bimorph cantilever actuator of claim 28 uses the travel range extension method to improve the travel range of the actuator.

33. The piezoelectric monomorph cantilever actuator of claim 27 uses both the force enhancement method and the travel range extension method to improve the performance of the segmented mirror device.

34. The piezoelectric bimorph cantilever actuator of claim 28 uses both the force enhancement method and the travel range extension method to improve the performance of the segmented mirror device.

35. The segmented mirror device of claim 18 in which the spacer structures are not electrically conductive.

36. The segmented mirror device of claim 18 in which the spacer structures are electrically conductive.

37. The segmented mirror device of claim 18 in which the substrate includes at least one electrically electrode in connection with the electrodes of the cantilever actuator assemblies.

38. The segmented mirror device of claim 18 in which the substrate includes semiconductor integrated driver circuits and associating electrodes in interconnection with the electrodes in the cantilever assemblies.

39. The segmented mirror device of claim 18 in which each cantilever actuator assembly is periodically patterned and has adjacent joints that maintain the piezoelectric material layer a monolithically continuous piece through the entire array of the piezoelectric cantilever actuator assemblies.

40. The monolithically continuous piece of claim 39 extends through the entire array of the piezoelectric cantilever actuator assemblies, thus providing an interconnected structure for metal coating to be applied on, capable of leading the electrical connection to the array edge, and as a result, establishing common electrode for part of or the entire array of the piezoelectric cantilever actuator assemblies.

* * * * *